United States Patent
Yong et al.

(10) Patent No.: US 8,331,265 B2
(45) Date of Patent: Dec. 11, 2012

(54) SYSTEM AND METHOD FOR ADAPTIVE BEAMFORMING TRAINING USING FIXED TIME WINDOW FOR HETEROGENEOUS ANTENNA SYSTEMS

(75) Inventors: Su Khiong Yong, Santa Clara, CA (US); Julan Hsu, Saratoga, CA (US); Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 454 days.

(21) Appl. No.: 12/723,468

(22) Filed: Mar. 12, 2010

(65) Prior Publication Data

US 2010/0265924 A1   Oct. 21, 2010

Related U.S. Application Data

(60) Provisional application No. 61/170,941, filed on Apr. 20, 2009.

(51) Int. Cl.
*H04W 72/06* (2009.01)
*H04W 24/02* (2009.01)
*H04J 3/00* (2006.01)

(52) U.S. Cl. ........ 370/254; 370/280; 370/294; 370/336; 370/345; 370/468

(58) Field of Classification Search ............ 370/280, 370/294, 336, 345, 458, 459, 468, 254; 342/147, 342/154, 423; 455/562.1
See application file for complete search history.

(56) References Cited

U.S. PATENT DOCUMENTS

| | | | |
|---|---|---|---|
| 6,778,137 B2 | 8/2004 | Krikorian et al. | |
| 7,317,428 B2 | 1/2008 | Bolle et al. | |
| 7,362,267 B2 | 4/2008 | Chi et al. | |
| 7,978,134 B2 * | 7/2011 | Niu et al. | 342/367 |
| 8,027,702 B2 * | 9/2011 | Soffer et al. | 455/562.1 |
| 2004/0174300 A1 | 9/2004 | Nakagawa | |
| 2009/0232109 A1 * | 9/2009 | Nandagopalan et al. | 370/336 |
| 2009/0232240 A1 * | 9/2009 | Lakkis | 375/260 |
| 2009/0238156 A1 * | 9/2009 | Yong et al. | 370/336 |
| 2010/0054223 A1 * | 3/2010 | Zhang et al. | 370/338 |
| 2010/0056062 A1 * | 3/2010 | Zhang et al. | 455/63.1 |
| 2010/0103045 A1 * | 4/2010 | Liu et al. | 342/372 |
| 2010/0157955 A1 * | 6/2010 | Liu et al. | 370/336 |
| 2010/0164802 A1 * | 7/2010 | Li et al. | 342/372 |
| 2010/0214169 A1 * | 8/2010 | Kafle | 342/368 |
| 2010/0215027 A1 * | 8/2010 | Liu et al. | 370/338 |

OTHER PUBLICATIONS

International Search Report and Written Opinion dated Dec. 8, 2010 for International Application No. PCT/KR2010/002424 from Korean Intellectual Property Office, pp. 1-9, Seo-gu, Daejeon, Republic of Korea.

* cited by examiner

*Primary Examiner* — Chi Pham
*Assistant Examiner* — Ahmed Elallam
(74) *Attorney, Agent, or Firm* — Kenneth L. Sherman, Esq.; Michael Zarrabian, Esq.; Sherman & Zarrabian LLP

(57) ABSTRACT

A system and method for performing a beamforming training between heterogeneous wireless devices in a wireless network is disclosed. A number of time slots in a fixed-time period are assigned for transmit and/or receive sector training. The number of time slots assigned for transmit and/or receive sector training is based on an antenna configuration of a wireless station.

60 Claims, 12 Drawing Sheets

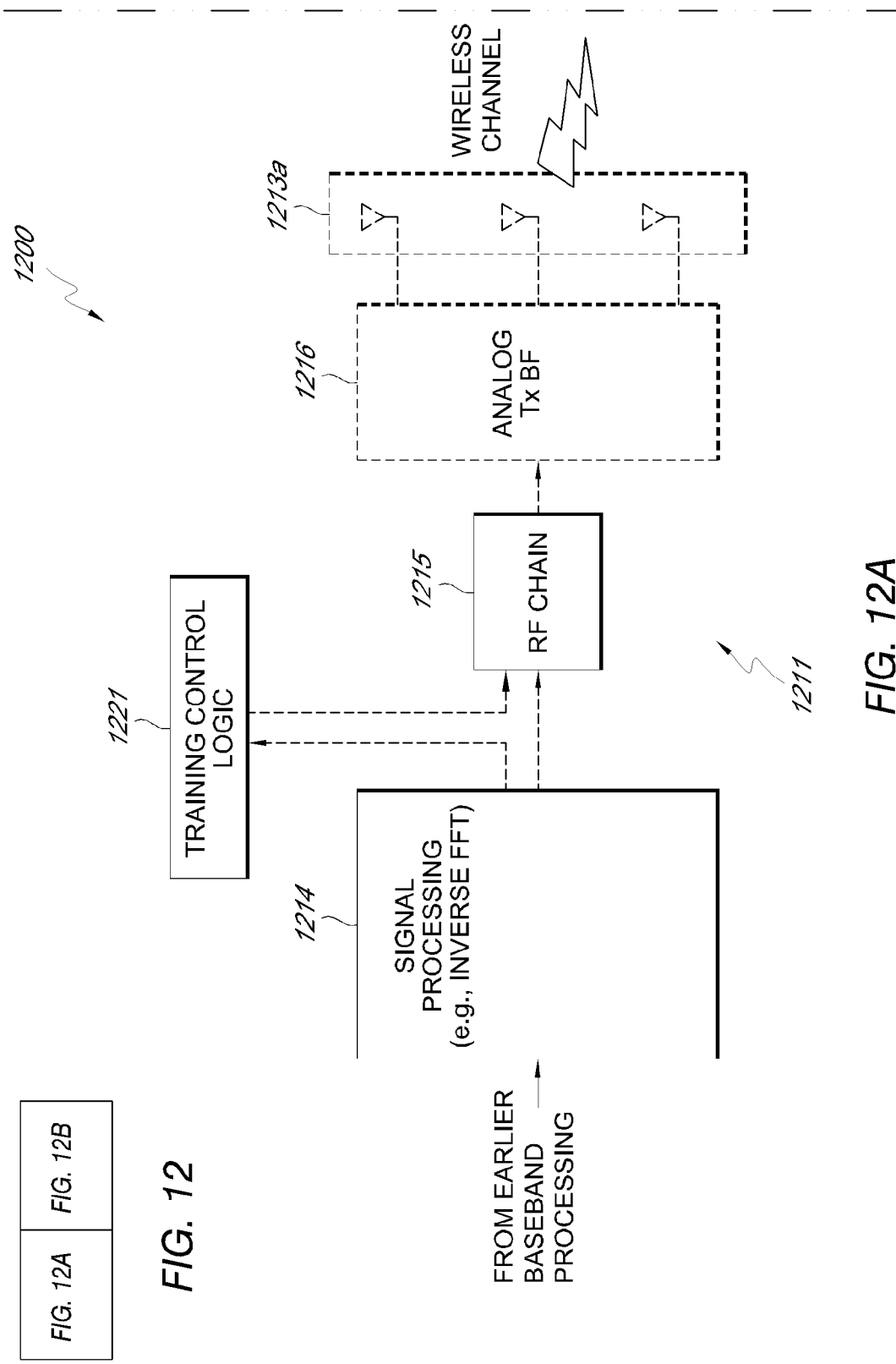

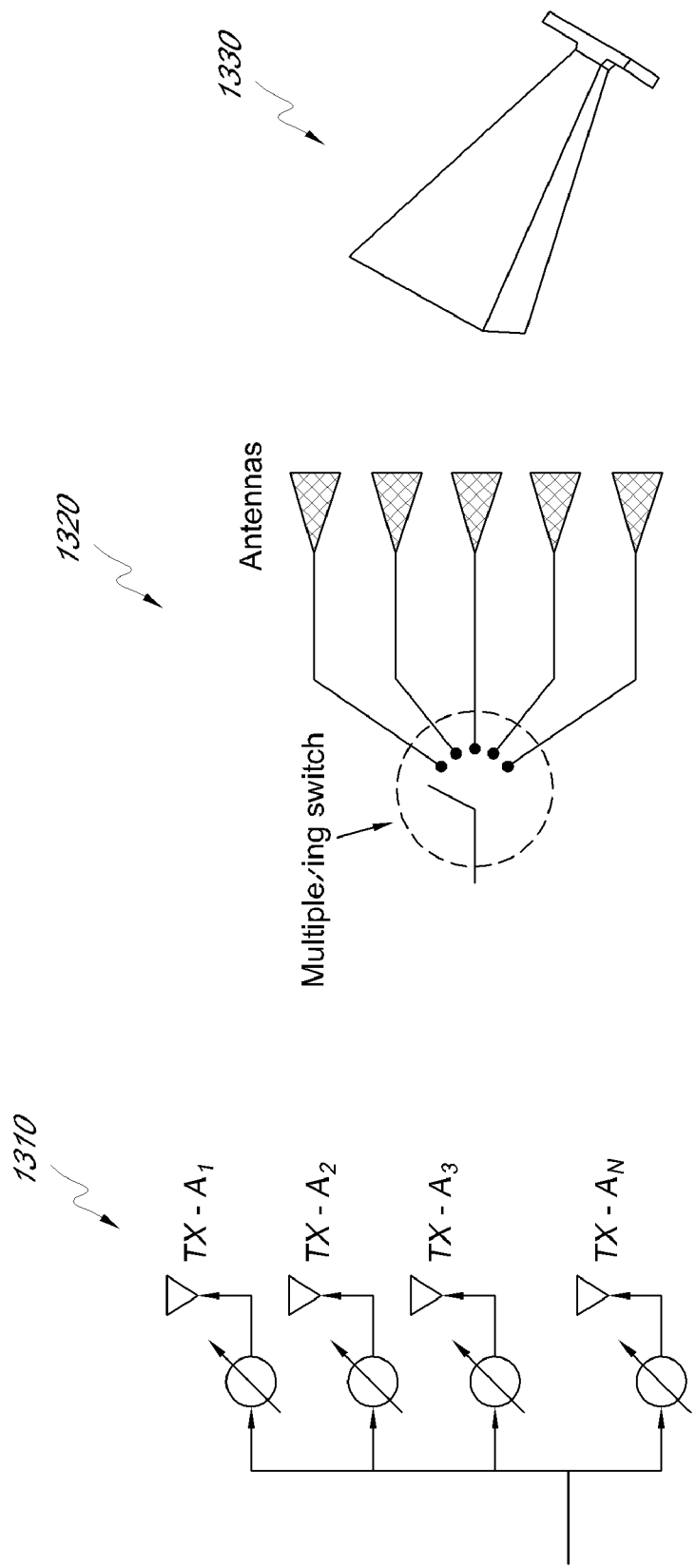

SYSTEM AND METHOD FOR ADAPTIVE BEAMFORMING TRAINING USING FIXED TIME WINDOW FOR HETEROGENEOUS ANTENNA SYSTEMS

CROSS-REFERENCE TO RELATED APPLICATIONS

This application claims the benefit of U.S. Provisional Patent Application No. 61/170,941, filed on Apr. 20, 2009, which is incorporated herein by reference in its entirety.

BACKGROUND

1. Field of the Invention

This invention relates to wireless communication, and in particular, to use of an efficient beamforming protocol to support heterogeneous antenna systems based on millimeter-wave technology.

2. Description of the Related Technology

One of the major challenges for millimeter wave (mm-wave) gigabit per second (Gbps) communications is the poor link budget, as a radio signal propagating in the mm-wave frequency band experiences significant path loss, reflection loss and other degradation. Given the lossy nature of the radio channel as well as the limited CMOS performance at a mm-wave band, Gbps communications becomes very challenging. To improve the link quality, directional transmission is generally preferred.

Due to the extremely short wavelength, it becomes possible and beneficial to integrate a large number (e.g., between 10 and 64) of antenna elements into an antenna package. Antenna based beamforming thus emerges as an attractive solution, featuring high beamforming gain and electronic steerability. An improvement in signal-to-noise (S/N) ratio can be achieved by periodically performing antenna trainings in a beamforming wireless system.

In some communication systems (e.g., wireless communications systems using mm-wave frequency band), stations may use heterogeneous antenna types including single antenna, fixed sector antenna, switched beam antenna, and phase antenna arrays. Often, an initial step required in such networks is to perform a beamforming (direction antenna finding for optimal transmission and reception) between a station and a network coordinator station to enable high throughput data transmission at a later stage. Therefore, a need exists for an efficient beamforming protocol having a fixed beamforming period that can accommodate heterogeneous antennas with less protocol overhead.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a method of performing a beamforming training between heterogeneous wireless devices in a wireless network. The method comprises securing a fixed-time period in a superframe to perform beamforming training, the fixed-time period comprising an initiator base training window and a responder base training window. The method further comprises determining a first number of slots of the fixed time-period used for transmit sector sweeping based on at least one of a number of transmit sectors of an antenna configuration and a number of receive sectors of the antenna configuration. The method further comprises determining a second number of slots of the fixed time-period used for receive sector sweeping based on at least one of the number of transmit sectors of the antenna configuration and the number of receive sectors of the antenna configuration. The method further comprises assigning the first number of slots to the initiator base training window. The method further comprises assigning the second number of slots to the responder base training window. The method further comprises transmitting a first plurality of training packets to a wireless device in a plurality of the transmit sectors in a plurality of the first number of slots, the wireless device to receive the first plurality of training packets and estimate a best transmit sector, wherein the best transmit sector comprises the sector associated with a first training packet of the first plurality of training packets received with a highest link quality. The method further comprises receiving data indicative of the best transmit sector from the wireless device. The method further comprises receiving a second plurality of training packets from the wireless device in a plurality of the receive sectors in at least one of the second number of slots. The method further comprises estimating a best receive sector, wherein the best receive sector comprises the sector associated with a second training packet of the second plurality of training packets received with a highest link quality so as to complete the beamforming training.

In another embodiment there is a method of performing a beamforming training between heterogeneous devices in a wireless network. The method comprises determining a first number of slots of a fixed time-period in a superframe used for transmit sector sweeping based on at least one of a number of transmit sectors of an antenna configuration and a number of receive sectors of the antenna configuration. The method further comprises transmitting at least a first training packet to a wireless device in at least one of the transmit sectors in the first number of slots, the wireless device being configured to receive the first training packet and estimate a best transmit sector, wherein the best transmit sector comprises the sector associated with the first training packet received with a highest link quality. The method further comprises receiving data indicative of the best transmit sector from the wireless device.

In yet another embodiment there is a method of performing a beamforming training between heterogeneous devices in a wireless network. The method comprises determining a first number of slots of a fixed time-period in a superframe used for receive sector sweeping based on at least one of a number of transmit sectors of an antenna configuration and a number of receive sectors of the antenna configuration. The method further comprises receiving at least a first training packet from a wireless device in at least one of the receive sectors in at least one of the first number of slots. The method further comprises estimating a best receive sector, wherein the best receive sector comprises the sector associated with the first training packet received with a highest link quality.

In another embodiment there is a method of performing a beam discovery between devices in a wireless network. The method comprises securing a fixed-time period in a superframe to perform beamforming training. The method further comprises determining a first number of slots of the fixed time-period used for at least one of transmit sector sweeping and receive sector sweeping based on at least an antenna configuration. The method further comprises determining a second number of slots of the fixed time-period used for at least one of transmit sector sweeping and receive sector sweeping based on at least the antenna configuration. The method further comprises mapping the first number of slots and the second number of slots to a total number of slots available within the fixed-time period.

In yet another embodiment there is a wireless network coordinator. The wireless network coordinator comprises an antenna. The wireless network coordinator further comprises a processor to secure a fixed-time period in a superframe to perform beamforming training, the fixed-time period comprising an initiator base training window and a responder base training window, determine a first number of slots of the fixed time-period used for transmit sector sweeping based on at least one of a number of transmit sectors of the antenna and a number of receive sectors of the antenna, determine a second number of slots of the fixed time-period used for receive sector sweeping based on at least one of the number of transmit sectors of the antenna and the number of receive sectors of the antenna, assign the first number of slots to the initiator base training window, assign the second number of slots to the responder base training window, transmit at least a first training packet to a wireless device in at least one of the transmit sectors in the first number of slots, the wireless device being configured to receive the training packet and estimate a best transmit sector, wherein the best transmit sector comprises the sector associated with the first training packet received with a highest link quality, receive data indicative of the best transmit sector from the wireless device, receive at least a second training packet from the wireless device in at least one of the receive sectors in at least one of the second number of slots, and estimate a best receive sector, wherein the best receive sector comprises the sector associated with the second training packet received with a highest link quality.

In another embodiment there is a wireless station. The wireless station comprises an antenna. The wireless station further comprises a processor to determine a first number of slots of a fixed time-period in a superframe used for transmit sector sweeping based on at least one of a number of transmit sectors of an antenna configuration and a number of receive sectors of the antenna configuration, transmit at least a first training packet to a wireless device in at least one of the transmit sectors in the first number of slots, the wireless device being configured to receive the first training packet and estimate a best transmit sector, wherein the best transmit sector comprises the sector associated with the first training packet received with a highest link quality, and receive data indicative of the best transmit sector from the wireless device.

In yet another embodiment there is a wireless station. The wireless station comprises an antenna. The wireless station further comprises a processor to determine a first number of slots of a fixed time-period in a superframe used for receive sector sweeping based on at least one of a number of transmit sectors of an antenna configuration and a number of receive sectors of the antenna configuration, receive at least a first training packet from a wireless device in at least one of the receive sectors in at least one of the first number of slots, and estimate a best receive sector, wherein the best receive sector comprises the sector associated with the first training packet received with a highest link quality.

In another embodiment there is a wireless network coordinator. The wireless network coordinator comprises an antenna. The wireless network coordinator further comprises a processor to secure a fixed-time period in a superframe to perform beamforming training, determine a first number of slots of the fixed time-period used for at least one of transmit sector sweeping and receive sector sweeping based on at least an antenna configuration, determine a second number of slots of the fixed time-period used for at least one of transmit sector sweeping and receive sector sweeping based on at least the antenna configuration, and map the first number of slots and the second number of slots to a total number of slots available within the fixed-time period.

BRIEF DESCRIPTION OF THE DRAWINGS

FIGS. 12A and 12B are functional block diagrams of an example beamforming wireless system comprising two beamforming communication devices—a transmitter and a receiver—that are configured to perform an antenna training session prior to transmitting data using the trained antennas.

FIGS. 13A, 13B, and 13C are diagrams showing examples of different types of directional antenna that can be incorporated in transmit or receive devices such as the ones shown in FIG. 12.

DETAILED DESCRIPTION OF CERTAIN INVENTIVE EMBODIMENTS

Figure 1:
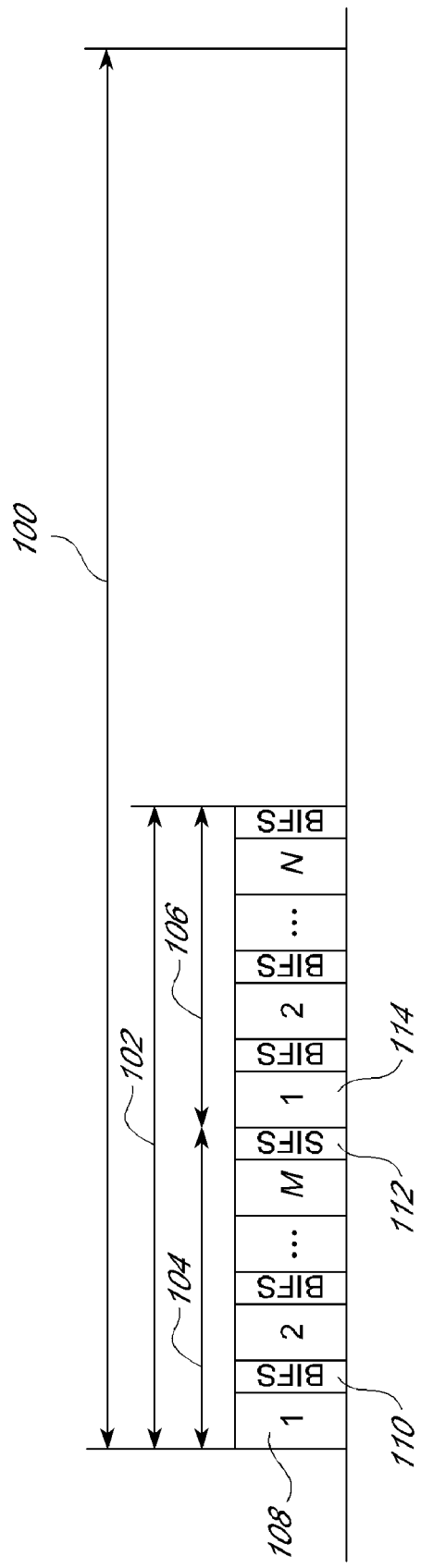
FIG. 1 is a diagram illustrating one embodiment of a superframe with a fixed-time beamforming period used for beamforming training between a first station and a second station.

Certain embodiments provide a method and system for adaptive beamforming training using a fixed time window for heterogeneous antenna systems such as single antenna, fixed sector antenna, switched beam antenna, and phase antenna arrays. In some embodiments, the throughput of the wireless network is improved by beamforming different types of antennas belonging to transmit and receive devices via the adaptive beamforming protocol described below.

The following detailed description is directed to certain sample embodiments of the invention. However, the invention can be embodied in a multitude of different ways as defined and covered by the claims. In this description, reference is made to the drawings wherein like parts are designated with like numerals throughout.

Various embodiments of the beamforming protocol for heterogeneous directional antennas described herein can be applied to various wireless standards including the Wireless Gigabit Alliance (WiGig) Standard, IEEE 802.15.3c, and ECMA TC48 standards on mm-wave communication networks and are able to support transmit-receive devices that may use different antenna types with varying number of antenna elements. In addition, the training overhead can be minimized by using a fixed time window for beamforming.

The beamforming protocol described herein can support directional transmissions between diverse antenna configurations, including a switched (sectored) array antenna, a phased array antenna, and a single antenna element. Antenna training protocols for homogeneous antenna configurations involving the same types of antennas (e.g., the phased array antennas) at both the transmit and receive devices have been disclosed in U.S. patent application Ser. No. 11/881,978, entitled "Method and System For Analog Beamforming In Wireless Communication System", filed on Jul. 30, 2007, herein incorporated by reference in its entirety. Beamforming protocols for heterogeneous antenna configurations will be described below. The beamforming protocols may be performed between a first associated station (STA1) and a second associated station (STA2) of a wireless communication network. In some embodiments, one of the stations (e.g., STA1) may comprise a network coordinator station (coordinator).

Data wirelessly transmitted between devices via antennas trained with certain embodiments of the beamforming protocol described herein may include one or more of motion video, still images, or any other suitable type of multimedia data.

I. Overview

Each associated station (STA) of a wireless communication network may be configured to transmit and receive communications over a particular geographical area. For example, the geographical area may be represented by a circle around the STA as shown in FIGS. 2 and 3. Further, the STA supports directional transmission and reception of communications within the geographical area. The geographical area may therefore be divided into a number of transmit sectors and a number of receive sectors, wherein the sectors correspond to the directional capabilities of the STA. Each of the transmit sectors is a different geographical direction that the STA can directionally transmit data. Each of the receive sectors is a different geographical direction that the STA can receive data. The number of transmit and receive sectors of the STA are dependent on the antenna configuration of the STA. In one embodiment, the number of transmit sectors and receive sectors of an STA are the same. In another embodiment, the number of transmit sectors and receive sectors of an STA are different. Further, in one embodiment the number of transmit and receive sectors of an STA may be static. In another embodiment, the number of transmit and receive sectors of an STA may be dynamic and change over time.

For communications between two STAs, STA1 and STA2, it may be beneficial to determine a best transmit sector and a best receive sector for each of the STAs. Each STA may communicate with one or more STAs on a forward link (FL) and/or a reverse link (RL) at a given moment. The forward link and reverse link for communications between STA1 and STA2 from the reference point of STA1 may be described as follows. The forward link of STA1 for communications with STA2, for example, is the transmission of data from STA1 to STA2. The reverse link of STA1 for communications with STA2 is the reception of data at STA1 from STA2. STA1 and STA2 may each perform both forward link and the reverse link for both transmit sectors and receive sectors. The STAs may perform both a transmit sector sweep (TXSS) where the STA tests one or more of their transmit sectors for communication quality in that transmit sector, and a receive sector sweep (RXSS) where the STA tests one or more of its receive sectors for communication quality in that receive sector. STA1 and STA2 may perform a forward link TXSS (F-TXSS) to determine a best transmit sector for STA1. STA1 and STA2 may perform a reverse link (R-RXSS) to determine a best receive sector for STA1. STA1 and STA2 may perform a reverse link TXSS (R-TXSS) to determine a best transmit sector for STA2. STA1 and STA2 may perform a forward link RXSS (F-RXSS) to determine a best receive sector for STA2. Thus, beamforming may be performed for four different sets of sectors.

In one embodiment, the wireless communication system comprises one or more STAs (e.g., STA1 and STA2). The STAs may use a superframe structure for data transport. The superframe may correspond to a time interval for data communication between STAs that repeats over time. The superframe may be divided into time slots. Each time slot may be reserved for one or more types of communication between STAs. For example, different time slots in the superframe may be reserved for sweeping of different sectors as discussed below.

One of the STAs of the wireless communication network may be a network coordinator station (coordinator). The coordinator may be configured to reserve time slots in a superframe for use for beamforming training. The coordinator may transmit information to other STAs regarding the reserved time slots and other forward and/or reverse link training setup information between different STAs. For example, in one embodiment, a coordinator may reserve time slots in a superframe for beamforming training between itself and another STA. In this embodiment, the coordinator may be STA1 and the other STA may be STA2. The coordinator STA1 may send information regarding the reserved time slots for training setup to STA2. In another embodiment, a coordinator may reserve time slots in a superframe for beamforming training between two other STAs. In this embodiment, the coordinator may send information regarding the reserved time slots for training setup to a STA1 and a STA2.

In some embodiments, the coordinator prescribes a fixed-time BF period (FBP) for initial sector training (IST) in a superframe. During the FBP, the coordinator performs IST with an STA where it can adaptively perform TXSS and RXSS. In one embodiment, the coordinator may accommodate all of the coordinator TXSS and coordinator RXSS within the fixed time BF window in timeslots. In another embodiment, the coordinator may leave some timeslots unused. In yet another embodiment, the coordinator may perform multiple rounds of RXSS by covering all directions either in a uniform or non-uniform manner. The actual use of time slots for TXSS and RXSS may depend on the coordinator STA capability and environment it is serving.

In one embodiment, the FBP may be different for each superframe. In some embodiments, within the FBP, forward link and reverse link TXSS may be performed at the coordinator and the STA, respectively. In another embodiment, forward and reverse RXSS may be performed at the STA and the coordinator, respectively. In yet another embodiment forward TXSS and reverse RXSS may be performed at the coordinator. In yet another embodiment forward RXSS and reverse TXSS may be performed at the STA.

In some embodiments, simultaneous beamforming training for heterogeneous antenna types (single element, sector antenna, phased array antenna, etc.) is performed using universal mapping of TX/RX sweeping within the FBP.

In some embodiments, following the IST, association and remaining training (RT) may take place in any order to enable association at a sufficiently higher modulation and coding scheme (MCS) than the CTRL PHY (Control PHY which is also known as common mode), which results in shorter training time.

Some embodiments allow multiple STAs to be associated during the fixed time window as opposed to single STA association in one superframe.

The above described embodiments may allow for faster BF training, without the need to perform an exhaustive search. They may also allow for beamforming before and after association. Further, the embodiments may allow adaptation of training to support low power devices and adaptively adjust the BF timing windows based on usage of the communication system. The above embodiments may also satisfy heterogeneous antenna configurations without requiring specific implementation such as, for example, omni-directional receive (RX Omni).

II. Fixed-Time Beamforming Period (FBP) for Initial Sector Training

FIG. 1 illustrates an example superframe with a fixed-time beamforming period used for beamforming training between an STA1 and an STA2. In some embodiments, an associated station STA1 in a network system secures the fixed-time period 102 in a superframe 100 for other potential stations to perform beamforming training with station STA1. In such embodiments, STA1 is the coordinator. In one embodiment, STA2 may attempt to perform beamforming training with STA1. In some embodiments, STA1 does not have prior communication with STA2 and may not know of the existence of STA2. In such embodiments, STA1 may not know STA2's antenna capability when securing the FBP. In other embodiments, STA1 may have prior communications with STA2 and may know STA2's antenna capability.

In some embodiments, the STA1-secured FBP 102 consists of a first training window 104 and a second training window 106. The first training window 104 may be used for beamforming training for one of the four different sets of sectors described above, and the second training window may be used for beamforming training for another of the four different sets of sectors described above. For example, one or more of the training windows may correspond to an initiator base training window. The initiator base training window may be used for F-TXSS or R-RXSS. Further, one or more of the training windows may be referred to as a responder base training window. The responder base training window may be used for R-TXSS or F-RXSS. A training window used to perform F-TXSS or F-RXSS may be referred to as a forward link training window. A training window used to perform R-TXSS or R-RXSS may be referred to as a reverse link training window.

The first training window 104 may comprise M first training slots 108. The second training window 106 may comprise N second training slots 114. Each of the M first training slots 108 may be separated by a Beamforming Inter-Frame Spacing (BIFS) time interval 110. Further, each of the N second training slots 114 may be separated by the BIFS time interval 110. The first training window 104 and the second training window 106 may be separated by a Short Inter-Frame Spacing (SIFS) time interval 112.

In one embodiment, the first training window 104 and the second training window 106 may both comprise initiator base training windows. Further, the first training window 104 may comprise a forward link training window and the second training window 106 may comprise a reverse link training window. Accordingly, the first training window 104 may be used to find a best transmit sector for the STA1 and the second training window 106 may be used to find a best receive sector for the STA1. During the first training window 104, STA1 may transmit its training sequences for up to M times in the M first training slots 108 to perform F-TXSS. Similarly, during the second training window 106, STA2 may transmit training sequences for up to N times in the N second training slots 114 to perform R-RXSS.

In some embodiments, the forward link transmissions may carry additional information about reverse link training setup and other management information (e.g., beacon information if STA1 is the coordinator). Accordingly, in such embodiments, the duration of a forward training slot (e.g., first training slots 108) may be equal or larger than the duration of a reverse training slot (e.g., second training slots 114).

In some embodiments, where STA1 is the coordinator and has secured an FBP 102 to perform IST, the IST performed by STA1 includes use of first training window 104 as a forward link training window to perform F-TXSS. The IST performed by STA1 further includes use of the second training window 106 as a reverse link training window to perform R-RXSS. The total length of the FBP 102, $D_{FBP}$, in such embodiments is the sum of the durations of first training window 104 and second training window 106. The length may be fixed and calculated as:

$$D_{FBP} = M^*D_{TXSS} - \text{BIFSTime} + \text{SIFSTime} + N^*D_{RXSS} = \text{constant}, \qquad (1)$$

where $D_{TXSS}$, $D_{RXSS}$ denote durations of one first training slot 108 used for TXSS and one second training slot 114 used for RXSS, respectively; BIFSTime and SIFSTime represent the duration of BIFS 110 and SIFS 112, respectively; M and N denote the number of available sectors used for TXSS and RXSS. (Note that $D_{TXSS}$ and $D_{RXSS}$ notations already include BIFS time (BIFSTime) for each training slot M and N, respectively.)

In some embodiments, $D_{FBP}$ may be known in advance by the coordinator and all STAs present in the network. One such embodiment is where the same fixed FBP 102 is used for each superframe 100. In another embodiment, the $D_{FBP}$ can be assigned differently at every superframe 100. In one such embodiment, the $D_{FBP}$ may be determined by the STAs in the network by decoding the training packet (e.g., frame) received from the coordinator.

In some embodiments, beamforming training among heterogeneous antenna type devices is performed during the FBP window 102. During the beamforming training the coordinator may adaptively perform TXSS and RXSS. The coordinator may optimally fit the number of M and N within the FBP window 102. The selection of M and N may depend on the actual coordinator antenna capability and the environment it is serving. In some embodiments, TXSS and/or RXSS configurations are universally mapped to the FBP 102, which may enable optimized training between any heterogeneous antenna type devices without prior antenna capability exchange.

During the IST, the coordinator may assign $N_{TXSS}$ ($N_{TXSS} \leq M$) time slots for F-TXSS (forward TXSS) and $N_{RXSS}$ ($N_{RXSS} \leq N$) time slots for R-RXSS (reverse RXSS) for an FBP with a total of M+N available slots (first time slots 108 and second time slots 114). (Note that $N_{TXSS}$ and $N_{RXSS}$ may denote the actual slots used by the coordinator in TXSS and RXSS, respectively.)

In some embodiments, the coordinator STA1 may send $N_{TXSS}$ F-TXSS packets, one for each direction per time slot, over its intended coverage in space. STA2 may listen for F-TXSS packets in Quasi-Omni (Q-Omni) configuration where it listens over its entire coverage space. Upon detecting and decoding the F-TXSS packets, in some embodiments, STA2 may obtain the following information:

1. the number of TXSS to be performed, which STA2 may use to determine for what period to stay in receiving mode before switching to transmit mode;
2. the number of RXSS to be supported by STA2 (i.e., the number of times to send the training packet) and STA1 (the number of times to sweep the receive sectors);
3. timing of the IST process; and
4. a link quality indicator (LQI) associated with each of the coordinator STA1 TX sectors.

In other embodiments, the above information may be carried in a beacon wherein a BF information element (IE) can bear such information for TXSS and RXSS.

STA2 may switch from receiving mode to transmitting mode upon completion of the F-TXSS. STA2 may transmit $N_{RXSS}$ R-RXSS packets in Q-Omni mode where it transmits over its entire coverage space, while the coordinator STA1 listens by sweeping over the N receive sectors, once for each R-RXSS packet per time slot.

Figures 2A, 2B:
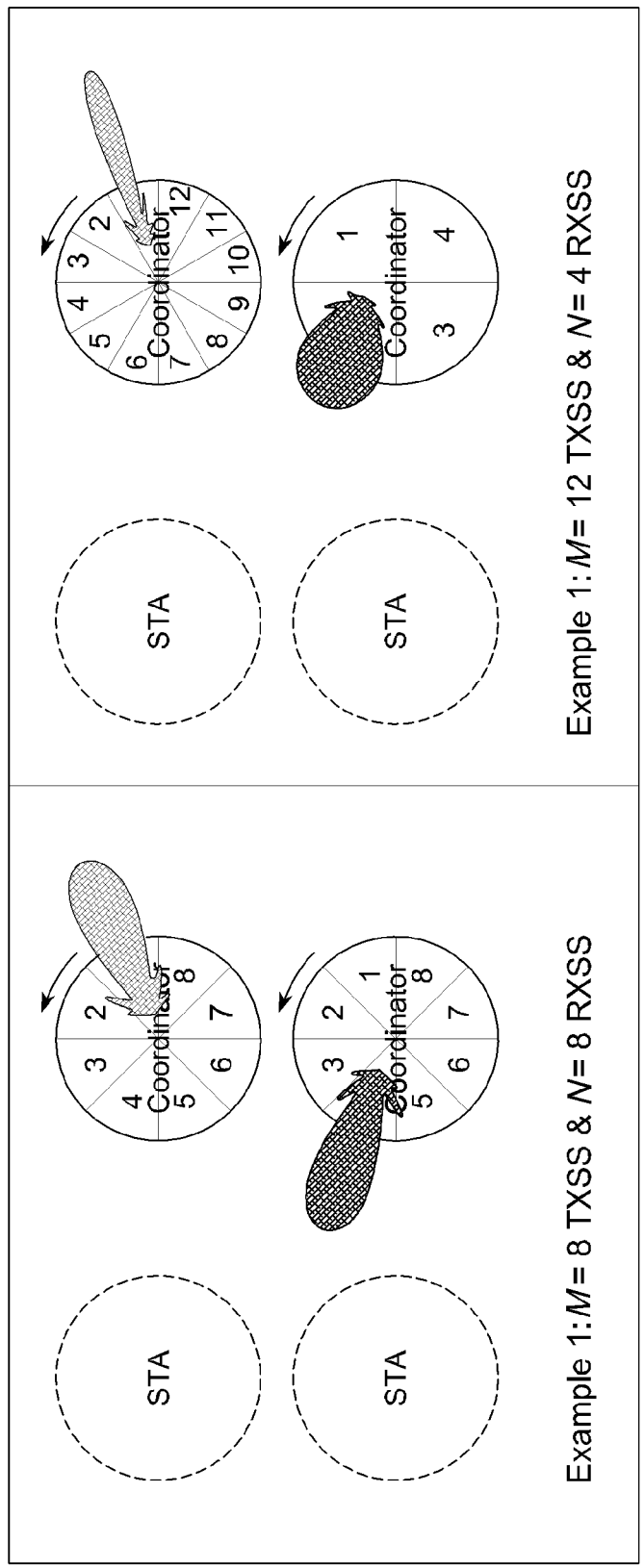
FIG. 2A is a diagram illustrating an example of a coordinator with a total of 16 transmit and receive sectors in which the fixed-time beamforming period includes a total of 16 slots
FIG. 2B is a diagram illustrating another example of a coordinator with a total of 16 transmit and receive sectors in which the fixed-time beamforming period includes a total of 16 slots.

FIGS. 2A and 2B illustrate two examples for a case in which the FBP 102 includes a total of 16 slots (i.e., sum of first training slots 108 and second training slots 114) for TXSS and RXSS (i.e., M+N=16). In the embodiment of FIG. 2A, the coordinator decides the 16-slot mapping based on its antenna capability. In this example, the coordinator maps the slots to perform 8-sector TXSS and 8-sector RXSS. The mapping corresponds to a configuration of $(M, N)=(N_{TXSS}, N_{RXSS})=(8, 8)$.

Similarly, in the embodiment of FIG. 2B, the coordinator sets a configuration of $(M, N)=(N_{TXSS}, N_{RXSS})=(12, 4)$. In this example, the coordinator maps its antenna configuration for 12 TXSS and 4 RXSS to cover the region of space that is of interest. In this example, the region of space of interest is 360°. In both FIG. 2A and FIG. 2B, the coordinator exhausts the FBP 102 (e.g., $N_{TXSS}=M$, $N_{RXSS}=N$). This type of exhaustive mapping is referred to as full FBP 102 utilization. In other embodiments, the coordinator does not exhaust the FBP 102 (e.g., $N_{TXSS}<M$ and/or $N_{RXSS}<N$) such as described below with respect to FIGS. 3A and 3B.

In other embodiments, STA2 R-TXSS training is performed in the second training window 106 instead of a coordinator R-RXSS. In some such embodiments, STA2 selects an optimal TXSS configuration for reverse training to utilize the N slots secured by the coordinator. In yet another embodiment, STA2 F-RXSS training is employed in the first training window 104 instead of a coordinator F-TXSS. In some such embodiments, the value of M and timing is communicated to STA2 by STA1 prior to the FBP 102.

In some embodiments, the sum of $N_{TXSS}$ and $N_{RXSS}$ is smaller than the total number of slots available in a FBP 102, for example, ($N_{TXSS} \leq M$ and $N_{RXSS} < N$) or ($N_{TXSS} < M$ and $N_{RXSS} \leq N$) such that $N_{TXSS}+N_{RXSS}<M+N$. Some such embodiments are described below:

a) In one embodiment, the antenna configuration at the coordinator is asymmetric such that the number of disjoint beams that the coordinator requires to cover the whole 360° in the RXSS is fewer than that are required in the TXSS. For example, in FIG. 3A a coordinator uses eight $N_{TXSS}$ and two $N_{TXSS}$ to cover the whole 360° in F-TXSS and R-RXSS, respectively. Accordingly, six slots in the FBP 102 are left unused (given that M+N=16 in a FBP 102).

b) In another embodiment, the antenna configuration at the coordinator is such that the number of disjoint beams that the coordinator is able to sweep while performing TXSS and RXSS is fewer than the sum of fixed number of slots in a FBP 102, i.e., M+N. For example, in FIG. 3B a coordinator is configured to use at most four $N_{TXSS}$ and four $N_{RXSS}$ slots to cover the whole 360° in F-TXSS and R-RXSS, respectively. Accordingly, eight slots in a FBP 102 are left unused (given that M+N=16 in the FBP 102).

c) In yet another embodiment, the coordinator is equipped with adaptive antenna arrays such that it intentionally uses asymmetric antenna patterns (or beams) for TXSS and RXSS. Accordingly, a number of slots in the FBP 102 are left unused.

One of ordinary skill in the art will recognize that other examples exist that cause partial utilization of FBP 102. In some embodiments, these unused slots are not used. In other embodiments these unused slots are used. Embodiments of methods to effectively use these unused slots in a FBP 102 are described below.

III. Multiple Transmission and/or Receive Opportunities

Figures 3A, 3B:
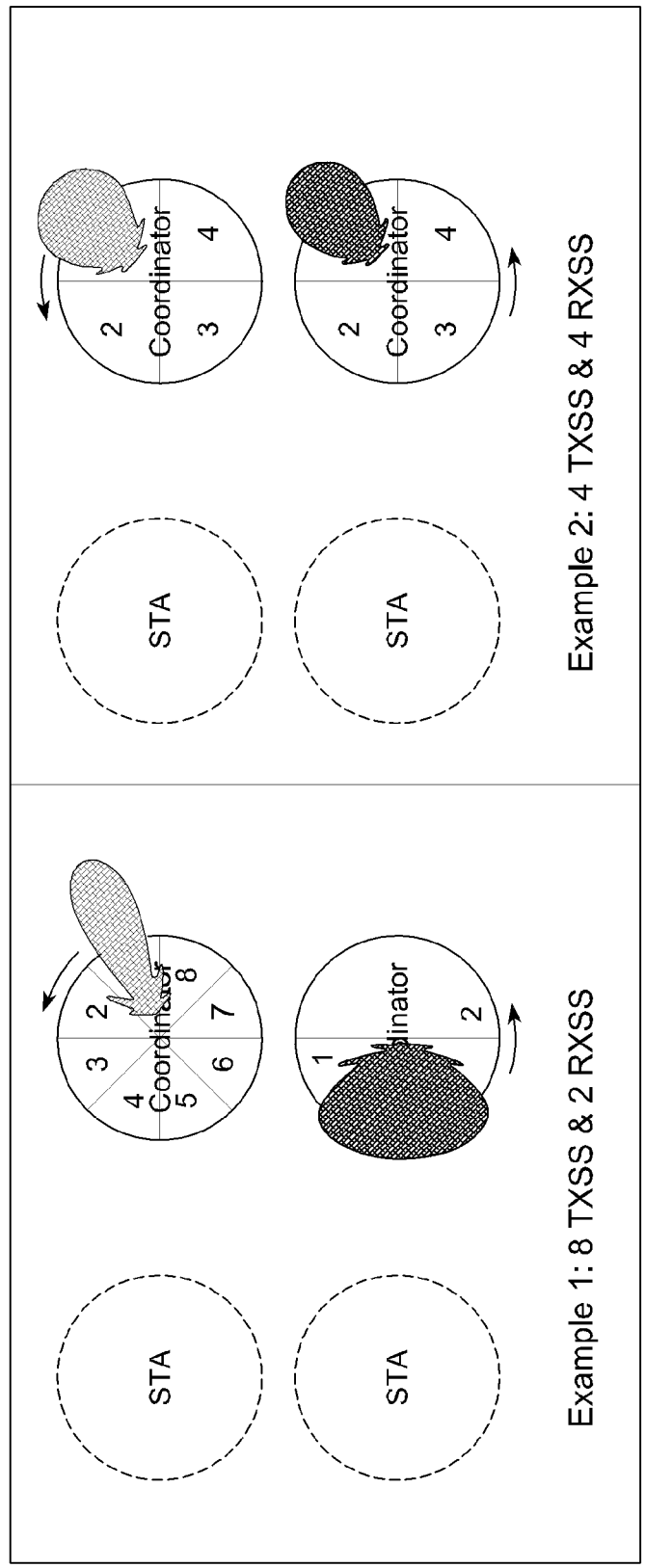
FIG. 3A is a diagram illustrating an example of a coordinator with 8 transmit sectors and 2 receive sectors in which the fixed-time beamforming period includes a total of 16 slots.
FIG. 3B is a diagram illustrating an example of a coordinator with 4 transmit sectors and 4 receive sectors in which the fixed-time beamforming period includes a total of 16 slots.
Figure 4:
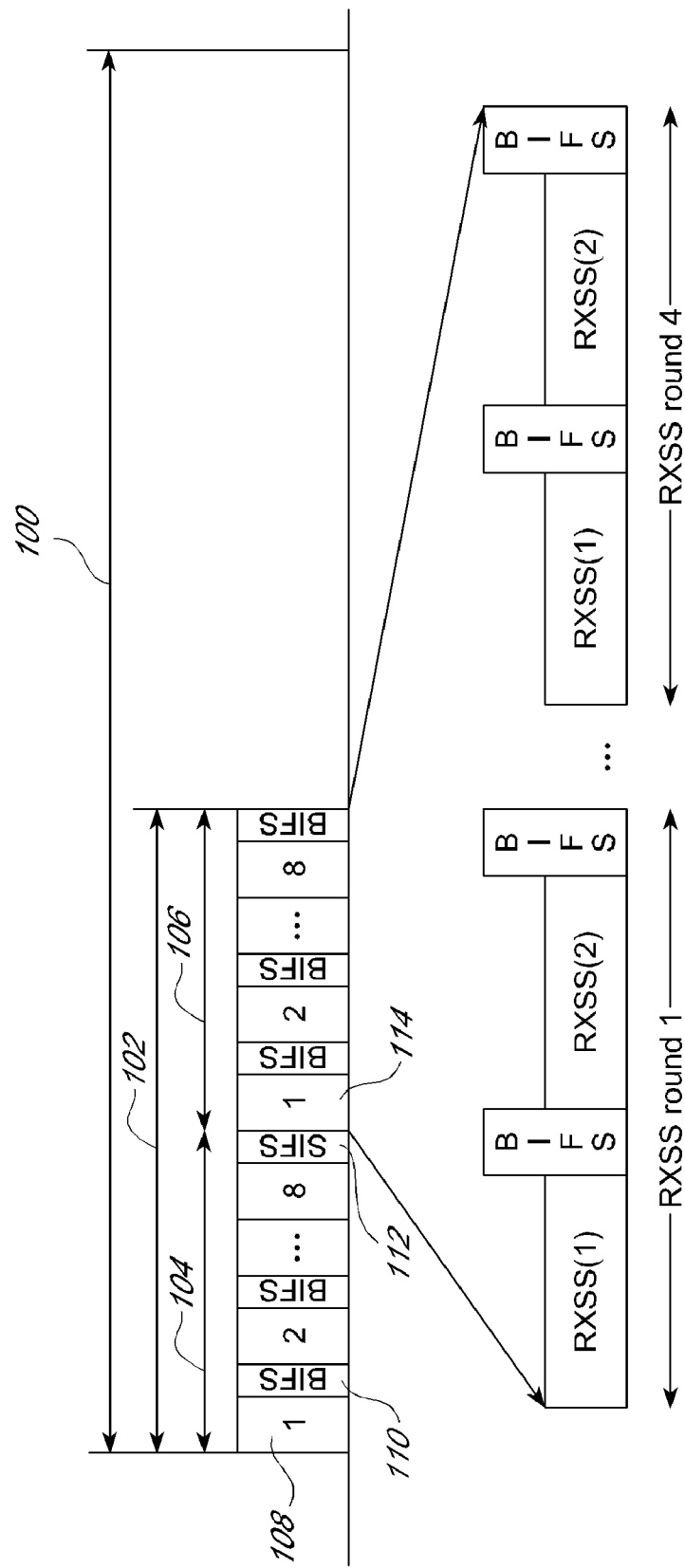
FIG. 4 is a diagram illustrating a second example superframe.

In some embodiments, the coordinator provides multiple transmission and/or receive opportunities by performing multiple rounds of TXSS or RXSS. For example, for any given sector of STA1 or STA2, multiple training slots 108, 114, as shown in FIGS. 1 and 4, may be used to sweep that sector in either RXSS or TXSS. For example, STA2 located within a beam or sector corresponding to a receive sector of the coordinator may have R transmission opportunities (over R RXSS rounds) to transmit to the coordinator while the coordinator listens in that receive sector. One RXSS round is defined as number of sectors the STA (e.g., the coordinator) needs to listen to cover the 360° space. For example, the coordinator configured with the antenna patterns as shown in FIG. 3A performs four rounds of RXSS (R=4) such that each round utilizes two second training slots 114 ($N_{RXSS}=2$): $S_{RXSS(1)}$ and $S_{RXSS(2)}$. An unassociated STA2 may select one of the four rounds to transmit an association request frame (e.g., packet) to the coordinator, or in other words, it has four opportunities to transmit such a request. The unassociated station STA2 may, in general, randomly select an RXSS round out of R opportunities. Therefore, R is the maximum number of unassociated stations that may associate with a coordinator during one FBP 102. FIG. 4 illustrates this example. When sending the association request to the coordinator in a reverse link (RL) transmission, an unassociated station STA2 may include an identifier to notify the coordinator the RXSS round selected by the station STA2. In one embodiment, the unassociated station STA2 may include a Medium Access Control (MAC) address in the association request frame to identify the requesting station STA2. In another embodiment, the coordinator can use the RXSS round identifier to differentiate between stations when sending forward link (FL) response frames (e.g., packets). The association request together with the RXSS round identifier may be included in a Physical (PHY) layer header, in a MAC layer header, etc.

In some embodiments, the number of training slots 108, 114 may not be an integer multiple of the number of transmit and/or receive sectors (e.g., receive sectors) of an STA. Referring to FIG. 4, for example, where second training slots 114 are used for R-RXSS, there are N=8 second training slots 114, and the coordinator has 3 receive sectors $N_{RXSS}=3$, multiple rounds of RXSS may not completely occupy all of the second training slots 114. In other words $N/N_{RXSS}$ is not an integer. In some such embodiments, the coordinator may perform multiple complete rounds of RXSS and any slots not used are left unused. In other embodiments, the last RXSS round may partially cover a few directions or sectors. In the partial RXSS round case, the coordinator may decide which directions to cover and which ones to skip.

Figure 5:
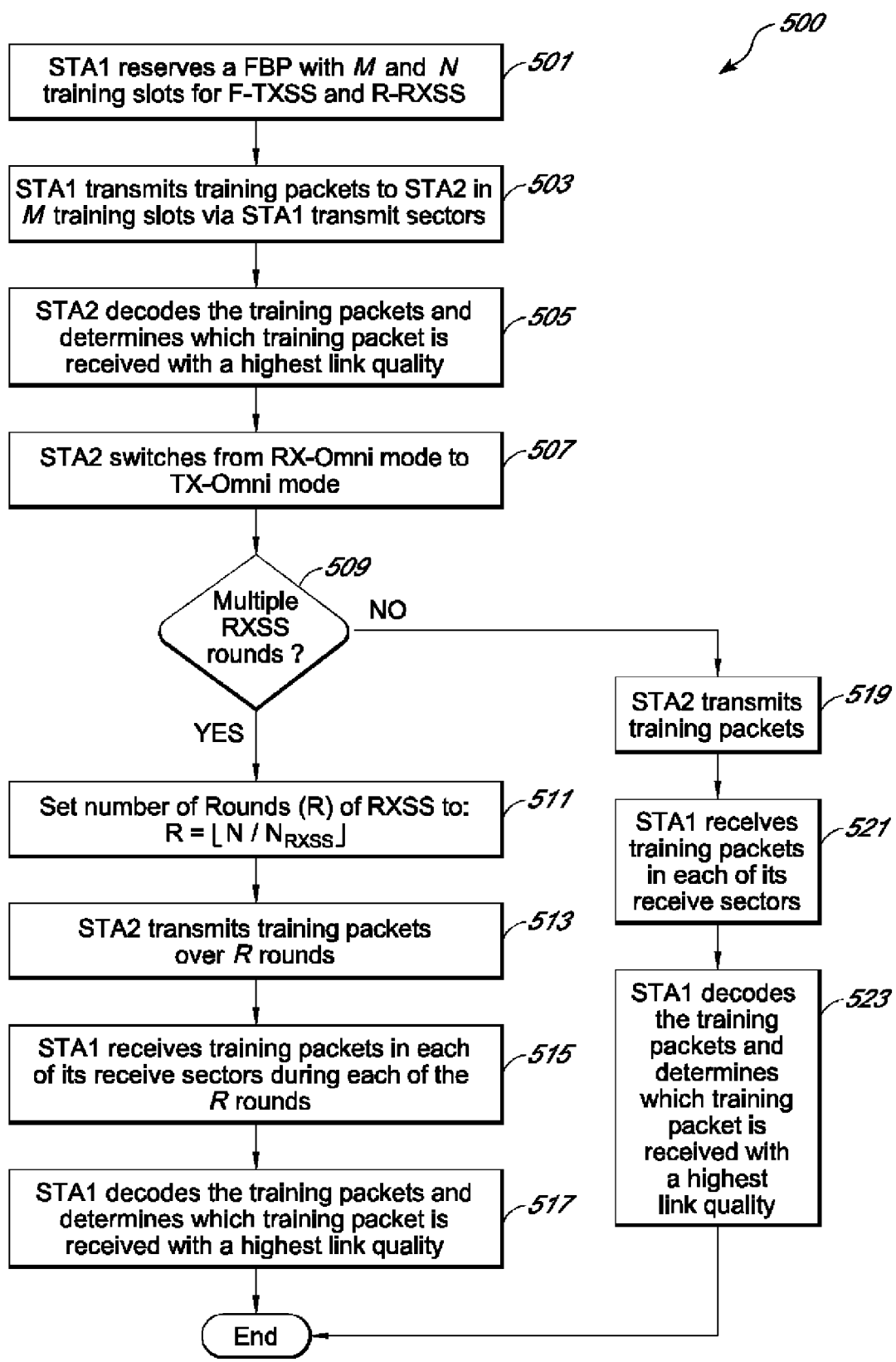
FIG. 5 is a flowchart illustrating an example of a process for time slot allocation during initial sector training (IST) for partial or full utilization of the fixed-time beamforming period.

FIG. 5 illustrates an example of a process for time slot allocation during IST for partial or full utilization of the FBP 102 shown in FIG. 1. In the embodiment of FIG. 5, a F-TXSS followed by a R-RXSS are performed during the FBP 102. At a first step 501, STA1 (the coordinator) may reserve a FBP 102 with M first training slots 108 for F-TXSS and N second training slots 114 for R-RXSS. At a next step 503, the STA1 may transmit training sequences in training packets to the STA2 in STA1s transmit sectors in the M first training slots 108, while the STA2 listens in an RX-Omni mode.

At a step 505, the STA2 may decode each of the training packets the STA1 transmitted in the M first training slots 108. The training packets may comprise a link quality indicator (LQI) for each of the training packets for each of the transmit sectors of the STA1. The STA2 and/or STA1 may utilize the LQIs to determine which transmit sector has the highest link quality. For example, the STA2 may measure a signal-to-noise ratio (SNR) as the link quality of each training packet transmitted on each of the transmit sectors of the STA1. In certain embodiments, the training packet associated with the STA1 transmit sector with the highest SNR (or average SNR/link quality) may correspond to the best transmit sector of STA1.

Continuing at a step 507, the STA2 switches from an RX-Omni mode to a TX-Omni mode. Further, at a decision step 509, the STA1 determines whether to perform multiple RXSS rounds. If the STA1 determines to perform multiple RXSS rounds, the process 500 continues to step 511. If the STA1 determines not to perform multiple RXSS rounds, the process 500 continues to step 519.

At the step 511, the number of rounds R to perform RXSS is set as $\lfloor N/N_{RXSS} \rfloor$. Continuing at a step 513, the STA2 transmits training sequences in training packets over the R rounds in TX-Omni mode. One or more of the training packets may comprise the LQIs of the transmit sectors of STA1. At the step 515, the STA1 sweeps over each of its receive sectors R times and receives the training packets transmitted by STA2 at step 513. Continuing at the step 517, the STA1 may determine a link quality for each of the training packets for each of the receive sectors of the STA1. The receive sector with the highest link quality (or average link quality) may be the best receive sector of the STA1. Process 500 then ends.

At a step 519, if no multiple RXSS rounds are performed, the STA2 transmits training sequences in training packets in TX-Omni mode. One or more of the training packets may comprise the LQIs of the transmit sectors of STA1. At the step 521, the STA1 sweeps over each of its receive sectors and receives the training packets transmitted by STA2 at step 519. Continuing at the step 523, the STA1 may determine a link quality for each of the training packets for each of the receive sectors of the STA1. The receive sector with the highest link quality (or average link quality) may be the best receive sector of the STA1. Process 500 then ends.

It should be noted that in other embodiments, various combinations of F-TXSS, F-RXSS, R-TXSS, and R-RXSS may be similarly performed. For example, a F-TXSS followed by a R-TXSS may also be performed. Further, various numbers of rounds of TXSS and RXSS may be performed in any combination. Also, any embodiment of FBP full utilization or FBP partial utilization may also be performed in any combination.

IV. Non-Uniform RXSS

In some embodiments, the coordinator may decide to use unused slots such as from slots 108, 114 in the FBP 102 such that it covers all directions non-uniformly during its TXSS or RXSS. For example, the coordinator may cover some directions/sectors more times than the rest of the directions in RXSS rounds. In another embodiment, the beamwidth to cover a sector of the RXSS may be non-uniform such that the beamwidth of some beams required to cover a sector is narrower than other beams (meaning the sectors may be of different sizes) in an RXSS round. In some embodiments, the coordinator decides whether to perform a non-uniform RXSS based on some prior information such as, for example, the number of associated STAs requesting continuous beam-refinement and their angular locations with respect to the coordinator, a clear channel assessment (CCA) trigger that indicates if the channel is busy, and/or unsuccessful packet decoding of the received packet (e.g., training packet) due to interference from other STAs, indicating contention between transmitted packets partially overlapped in time-domain. In one embodiment, with respect to FIG. 3A, the coordinator performs two rounds of RXSS such that each round consists of four RXSS sector sweeps (RXSS(1), . . . , RXSS(4)). For example, the beamwidth for the first sector sweep RXSS(1) may be 180° and the other three RXSS may each have a beamwidth of 60°. Accordingly, two RXSS rounds completely occupy the total available N=8 second training slots 114 (e.g., $S_{RXSS}$), where $S_{RXSS}$ is a slot within a RXSS period of a FBP 102. In another embodiment, some RXSS sectors may be swept more times than other RXSS sectors. For example, the coordinator may perform three rounds of RXSS such that the first two rounds each consist of three RXSS sector sweeps (RXSS(1), RXSS(2), RXSS(3)) while the third round consists of only two of the three RXSS sector sweeps. The beamwidth of each RXSS sector sweep may be 120°. Accordingly, one RXSS sector is swept one less time than the other two RXSS sectors over the N=8 second training slots 114. Other combinations are also possible such that no $S_{RXSS}$ are left unused while performing a non-uniform RXSS.

In some embodiments, a coordinator may perform multiple rounds of TXSS similar to the multiple rounds of RXSS method described above. Such multiple rounds of TXSS performed by the coordinator may result in a partial or full utilization of first training slots 108. In another embodiment, in the second training window 106, a coordinator remains in the omni (or pseudo-omni) RX mode and STA2 performs TXSS. In such cases, second training slots 114 may be utilized as R-TXSS slots and may not be completely utilized by STA2. In some such embodiments, similar to the above approaches discussed, a STA can perform multiple rounds of fully utilized or partially utilized TXSS. While performing the multiple rounds of TXSS, a STA may include an identifier to distinguish between different TXSS rounds.

In some embodiments, a coordinator attempts to match TXSS and RXSS such that they map to the M and N slots in a FBP 102. In some embodiments, where a coordinator needs more slots than available (M+N) to cover TXSS and RXSS, it may completely skip some directions or may cover all directions in multiple FBP 102 spanned over one or more superframes 100.

V. Applications of the Above-Described Beamforming Protocols

A. Uses of FBP in a Superframe

In one embodiment, STA1 is the coordinator and uses its beacon time in a superframe 100 as a forward link training window. It may allocate a reverse link training window following the beacon. In some embodiments, two types of STA2 may perform training here:
1. An unassociated STA that associates at a rate higher than control PHY;
2. An associated STA that loses its beam/sector with the coordinator and intends to re-train.

In some embodiments, a field of association request is included in STA2 reverse training transmissions to indicate the intent to associate. In some embodiments, following the reverse training window, the coordinator may initiate the association procedure with an unassociated STA2 or feedback new training results to an associated STA2.

In another embodiment, STA1 is not a coordinator and uses the FBP 102 for training among non-coordinator STAs. STA1 in this case requests reservation of the FBP 102 from a coordinator. Its position in the superframe 100 may be anywhere in a service period (SP).

The below described embodiments represent the case where STA1 is the coordinator. However, it should be noted that one of ordinary skill in the art will recognize that similar methods may be used for the case where STA1 is not the coordinator.

In one embodiment, following the IST training during FBP 102, an unassociated STA2 may request to:
1. associate with a coordinator and end;
2. directly perform beam refinement and then associate; or
3. associate with a coordinator first and then perform beam refinement. (Beam refinement procedures are described in a later section.)

B. Length of the FBP

In some embodiments, the duration of the FBP 102 is secured by a coordinator. Its length may be application and usage scenario driven. In one embodiment, the coordinator may be a single antenna handheld device. Such a coordinator may not go through extensive training in order to provide services to other handheld devices. For example, a short FBP 102 may be allocated, which allows just a few training slots 108, 114. In another embodiment, the coordinator may be a digital television (DTV) which has sophisticated phased array and it may setup a long window to train 64 sectors. In yet another embodiment, the system may be highly delay-sensitive and the coordinator may want to limit the time used to perform training.

C. Antenna Capability Based Beamforming Training

In one embodiment, the methods described enable antenna capability based BF training, which may include two stages: sector training and beam refinement. The sector training may be further divided into IST and final sector training (FST). In one embodiment, the IST may be performed within the prescribed FBP 102, wherein the coordinator performs F-TXSS followed by R-RXSS as described above. In another embodiment, the IST is performed within the prescribed FBP 102, wherein the coordinator performs F-TXSS followed by R-TXSS.

The following description refers to beamforming training embodiments that include full utilization of the FBP 102 in a single round. Similar methods for beamforming training may be performed for embodiments that do not utilize the full FBP in a single round.

1. Sector Training

Figure 6:
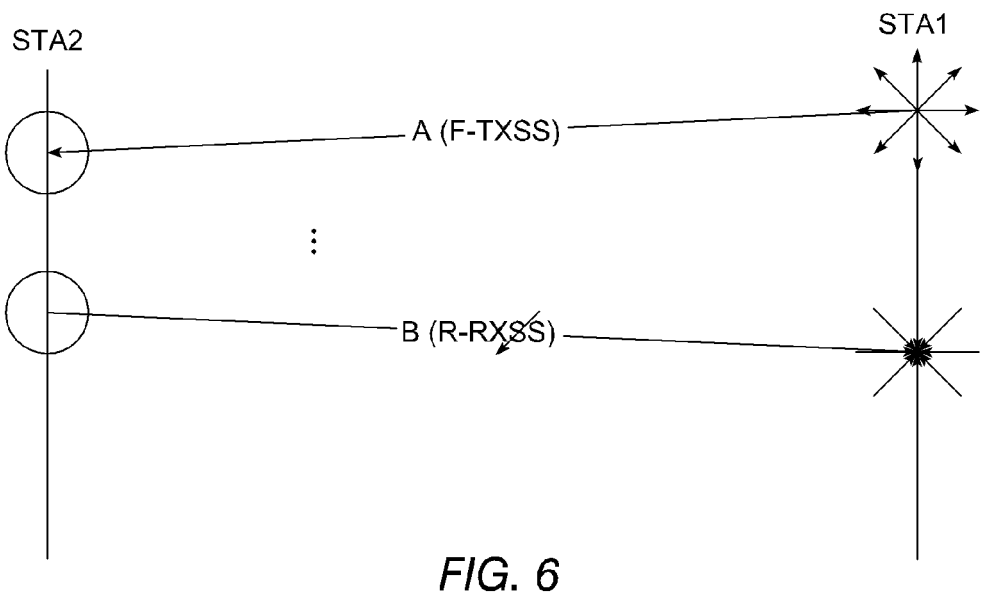
FIG. 6 is a diagram illustrating an example of a beamforming protocol during an initial sector training (IST) stage.

FIG. 6 illustrates an example of a BF protocol during an IST stage. In this embodiment the coordinator STA1 may, at its discretion, assign M (e.g., $N_{TXSS}$ in this case) first training slots 108 for F-TXSS and N (e.g., $N_{RXSS}$ in this case) second training slots 114 for R-RXSS for an FBP 102 with a total of M+N slots. In this embodiment, the coordinator may send M F-TXSS frames (e.g., training packets), one for each direction per slot 108 over its intended coverage, while STA2 listens in Q-Omni configuration.

In some embodiments, upon detecting and decoding the F-TXSS packets, STA2 may estimate the LQI associated with each of the coordinator TX sectors as well as determine the timing of the beamforming. STA2 may switch from the Q-Omni receiving mode to the Q-Omni transmitting mode upon completion of the F-TXSS. STA2 may transmit N R-RXSS packets in Q-Omni mode, while the coordinator listens by sweeping over the N receive sectors, one for each R-RXSS packet per direction per slot 114 over its intended coverage in space.

In other embodiments, the R-TXSS may be performed after F-TXSS wherein the STA2 switches from the Q-Omni receiving mode to transmit sector mode. STA2 may transmit N R-TXSS packets over its N transmit sectors, one for each R-TXSS packet per direction per slot 114 over its intended coverage in space, while the coordinator listens in Q-Omni configuration. The R-TXSS packet contains the LQIs for the STA1's sectors estimated in the F-TXSS.

In some embodiments, following the IST, an unassociated STA2 may perform association first and continue the remaining beamforming training (AFRT) or may directly perform the remaining beamforming training before associating (RTBA). In one embodiment of the AFRT process, an association request may be sent by STA2 to the coordinator during R-RXSS of the IST. The coordinator may respond by sending an association response to STA2 to associate. The response may include information exchange such as device capability, timing, etc. The association response may be transmitted at a higher MCS than the most robust MCS e.g., Control PHY used in the IST. In some embodiments, to differentiate between association and training process, a bit can be assigned to the PHY header to indicate either that the association request or the training is currently being performed.

Figure 7:
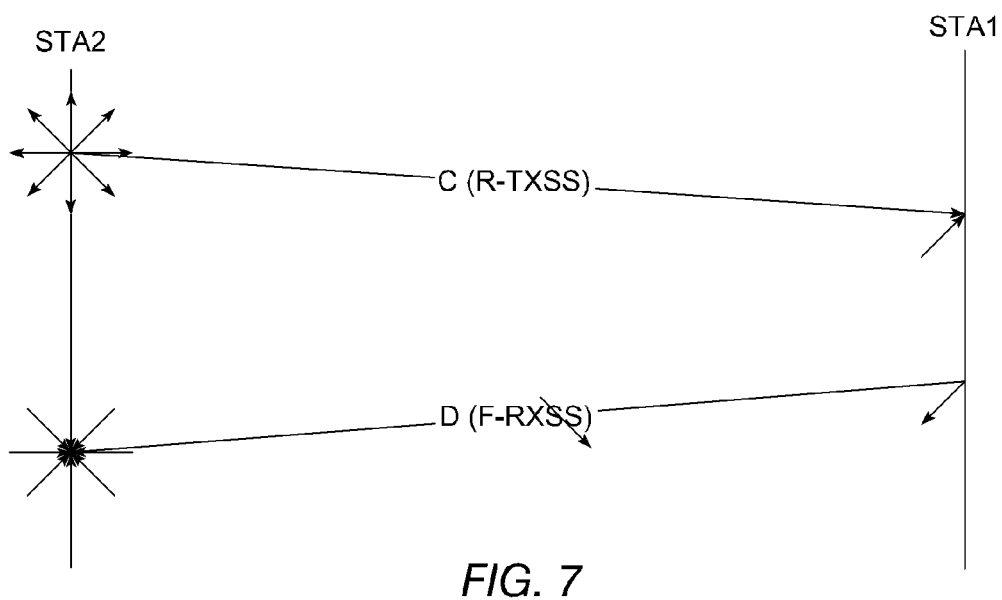
FIG. 7 is a diagram illustrating an example of final sector training.

FIG. 7 illustrates an example of final sector training. In some embodiments of either AFRT or RTBA, the remaining beamforming training may include FST and beam refinement. The FST may occur as shown in FIG. 7 where the coordinator reserves time for R-TXSS and F-RXSS with the knowledge of the antenna capability of the STA2. Assuming that STA2 has J and K transmit and receive sectors, respectively, in some embodiments, STA2 may first transmit J R-TXSS frames (e.g., training packets) which the coordinator receives using its best receive sector determined during IST Stage. Upon detecting and decoding the R-TXSS packets, the coordinator may estimate the LQI associated with each of the STA2 TX sectors. The coordinator may then switch from receiving mode to transmitting mode upon completion of the R-TXSS. The coordinator may then transmit K F-RXSS packets using the best transmit sector determined during IST Stage, while STA2 listens by sweeping over the K receive sectors, one per each F-RXSS packet.

In some embodiments, after the FST stage, both the coordinator and STA2 may know their best transmit and receive sectors and further beam refinement may be performed. Note that in some such embodiments, the coordinator obtains its best transmit and receive sectors after IST Stage, while STA2 obtains its best transmit and receive sectors after FST Stage.

2. Beam Refinement

In some embodiments, depending on the applications and/ or antenna capability, further beam refinement (BR) may be performed. In some embodiments further BR is performed based on a request. In some embodiments, for applications that utilize bi-directional traffic flows with antenna systems at both sides that support both transmit and receive functionality (e.g., wireless Ethernet), complete BR with both forward link (FL) and reverse link (RL) BR are used.

Figure 8:
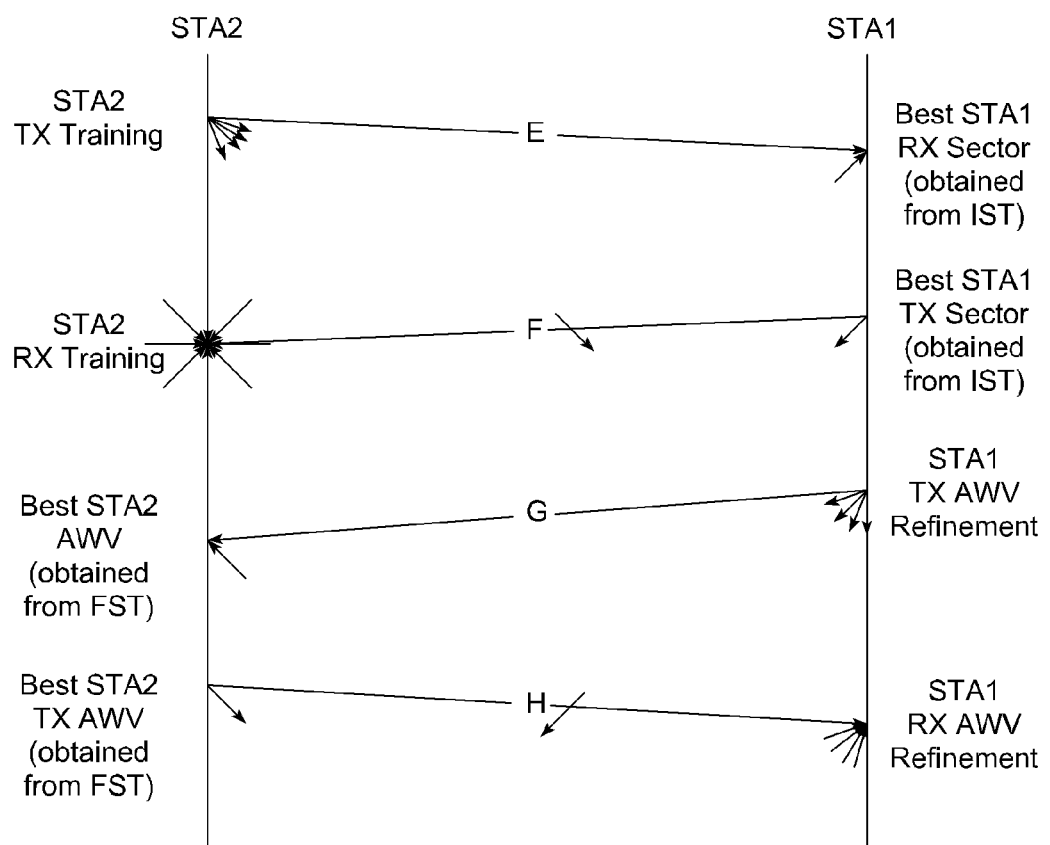
FIG. 8 is a diagram illustrating an example of beam refinement.

FIG. 8 illustrates an example of beam refinement. The embodiment of FIG. 8 may include Stages E, F, G and/or H as shown. In some embodiments of the request based BR, STA2 may first send a BR request to the coordinator. The following are the stages that may be involved in complete BR:

1. In Stage E, STA2 may first perform iterative TX training by sending BR frames (e.g., training packets) over the region of space defined during the FST Stage, while the coordinator listens via the former best received sector obtained during the IST Stage. After Stage E, the coordinator may estimate the best TX adaptive weight vector (AWV) of the STA2.
2. In Stage F, the coordinator may send BR frames with embedded feedback information about the best TX AWV of STA2 to train the STA2 RX AWV. Upon the completion of Stage E and F, STA2 may obtain its best TX AWV and RX AWV, which may be subsequently used in Stage H and G, respectively.
3. In Stage G, the coordinator may perform iterative TX training by sending BR frames over the region of space confined during IST Stage, while the STA2 listens via the former best AWV obtained during the former RX AWV training. After Stage G, STA2 may estimate the best TX AWV of the coordinator.
4. In Stage H, STA2 may send BR frames with embedded feedback information about the best TX AWV of the coordinator to train the coordinator RX AWV.
5. Upon the completion of Stage G and H, the coordinator may obtain its best TX AWV and
RX AWV, which will be subsequently used in Stage F and E, respectively. This process may be repeated over multiple iterations to converge to fixed TX and RX AWV for both the coordinator and STA2.

Figure 9:
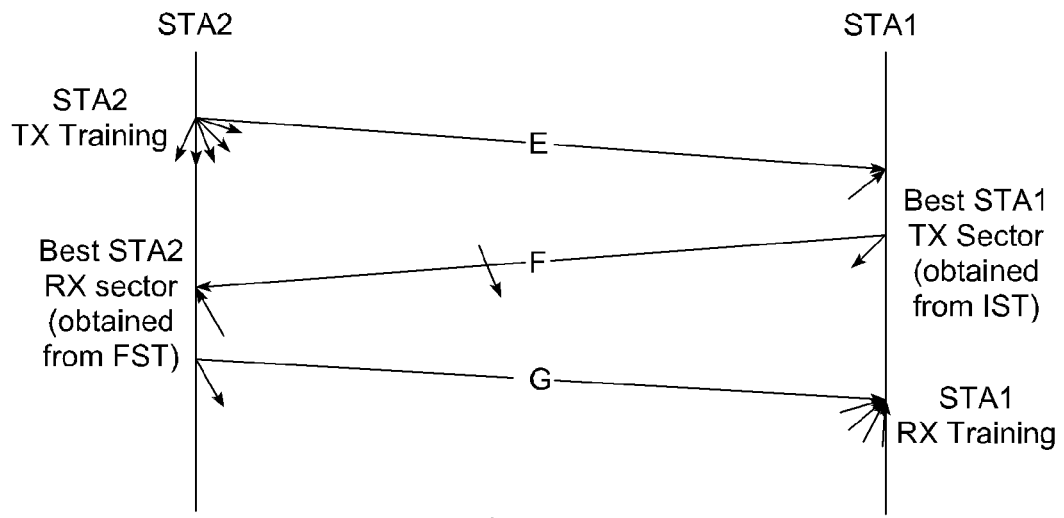
FIG. 9 is a diagram illustrating an example of partial beam refinement with reverse link beam refinement.
Figure 10:
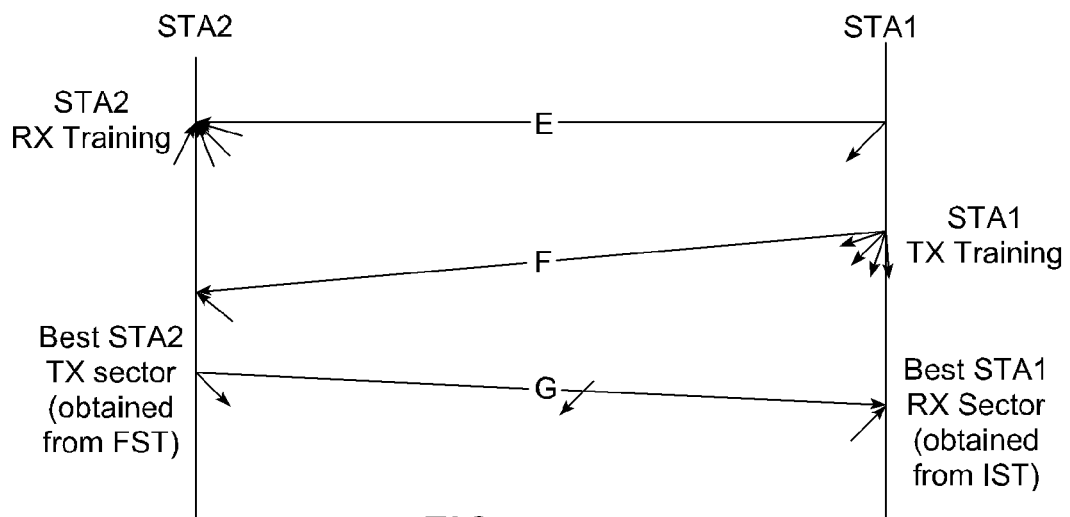
FIG. 10 is a diagram illustrating an example of partial beam refinement with forward link beam refinement.

In some embodiments, applications may utilize uni-directional traffic flow with antenna systems at both sides that at least support transmit and receive functionality (e.g., uncompressed video streaming). Some such embodiments may use partial BR where either forward link beam refinement (FLBR) or reverse link beam refinement (RLBR) is performed depending on the direction of the traffic flows and/or antenna capability. The partial BR may include Stage E, F, and/or G as shown in FIGS. 9 and 10 for RLBR and FLBR, respectively. In some embodiments of the request based BR, STA2 may first send a BR request to the coordinator or STA1 in the case of RLBR. In some embodiments, the coordinator may first send a BR request to the STA2 in the case of FLBR. The following are examples of the stages that may be included in RLBR such as shown in FIG. 9:

1. In Stage E, STA2 may perform iterative TX training by sending BR frames over the region of space confined during the FST Stage, while the coordinator listens via the former best received sector obtained during the IST Stage. After Stage E, the coordinator may estimate the best TX AWV of the STA2.
2. In Stage F, the coordinator may send feedback information about the best TX AWV of STA2 via the best transmit sector of the coordinator obtained during IST Stage, while STA2 listens via the best receive sector of the STA2 obtained during FST Stage. Stage F may be performed at CTRL PHY or slightly higher MCS than the MCS of the application it is intended to use. Upon the completion of Stage E and F, STA2 may obtain its best TX AWV which may be subsequently used in Stage G to train the RX AWV of the coordinator.
3. In Stage G, the STA2 may perform iterative RX training for the coordinator by sending BR frames via its best transmit AWV obtained in Stage E.
4. Upon the completion of Stage G, the coordinator may obtain its best RX AWV, which may be subsequently used in Stage E. This process may be repeated over multiple iterations to converge to fixed TX AWV at STA2 and RX AWV at the coordinator.

The following are examples of the stages that may be included in FLBR such as shown in FIG. 10:

1. In Stage E, the coordinator may perform iterative RX training for the STA2 by sending BR frames via its best transmit sector obtained during IST Stage, while STA2 may change its antenna patterns over the region of space confined during the FST Stage. After Stage E, STA2 may estimate the best RX AWV for use in Stage F.
2. In Stage F, the coordinator may perform iterative TX by sending BR frames over the region of space confined during the IST Stage, while STA2 listens using the best RX AWV obtained in Stage E. After completion of Stage F, STA2 may estimate the best TX AWV of the coordinator.
3. In Stage G, STA2 may send a feedback information about the best TX AWV of the coordinator via the best transmit sector of the STA2 obtained during the FST Stage while the coordinator listens via its best receive sector obtained during the IST Stage. Stage G may be performed at CTRL PHY or slightly higher MCS than the MCS of the application intended for use.
4. Upon the completion of Stage G, the coordinator may obtain its best TX AWV, which may be subsequently used in Stage E. This process may be repeated over multiple iterations to converge to fixed TX AWV at the coordinator and RX AWV at the STA2.

Figure 11:
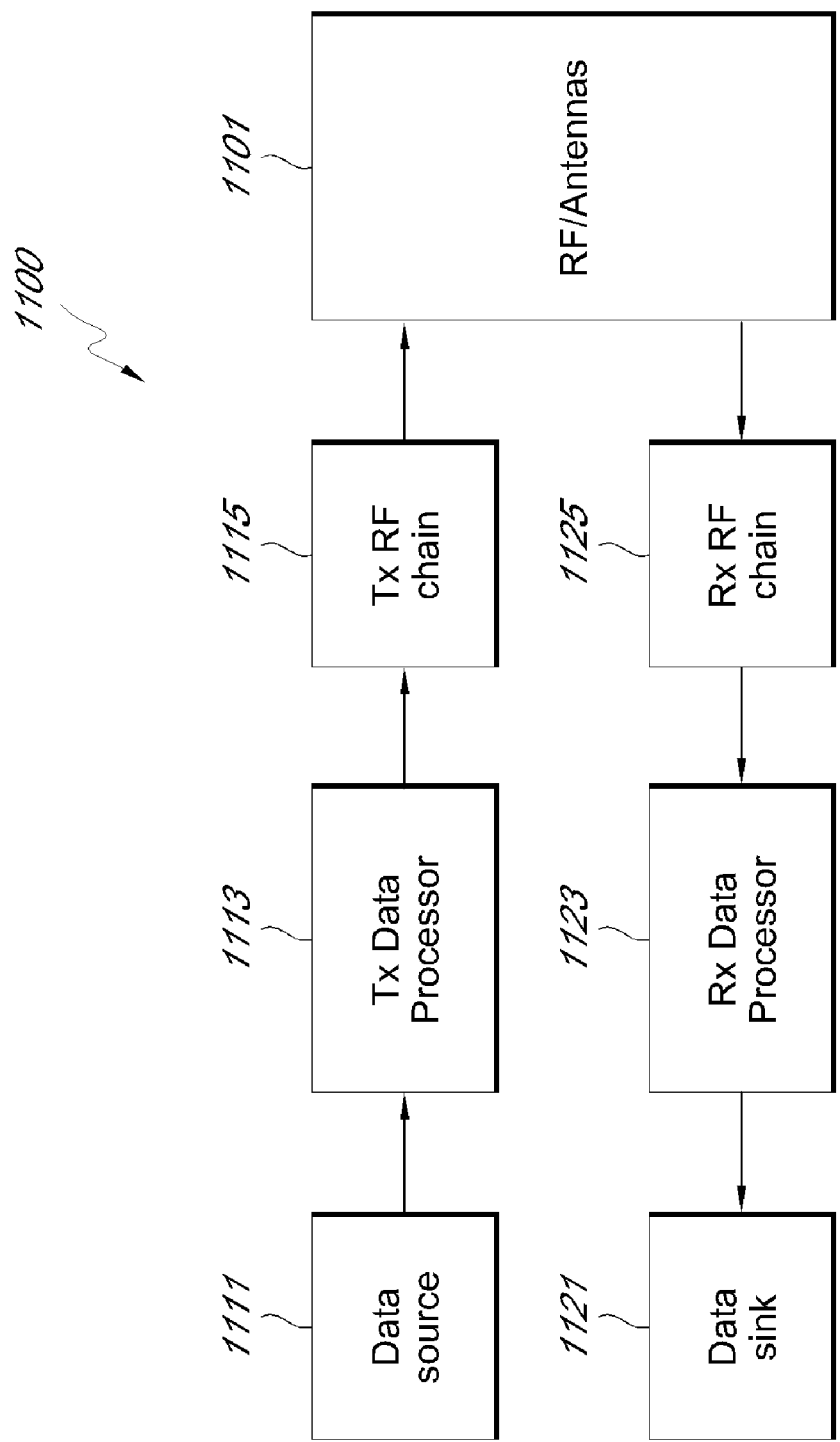
FIG. 11 is a functional block diagram illustrating an example transceiver structure that can represent a communication device incorporating the efficient beamforming protocol in a wireless system according to certain embodiments.

FIG. 11 is a functional block diagram illustrating an example transceiver structure 1100 of communication devices (e.g., STAs) that can transmit as well as receive data. The transceiver structure 1100 includes a data source 1111, a transmit (TX) data processor 1113, a TX radio frequency (RF) chain 1115, a receive (RX) RF chain 1125, a RX data processor 1123, a data sink 1121, and RF/Antennas module 1101.

The operation of the transceiver structure 1100 in the transmit mode is now described. In certain embodiments, the data source 1111 includes one or more memories for storing data to be transmitted. The TX data processor 1113 receives the data from the data source 1111 and processes the received data. The data processing can include, for example, an inverse Fast Fourier Transform (FFT), data compression, or security encoding performed in the digital domain. The TX RF chain 1115 receives the processed digital data and converts it into an analog data waveform. The RF/Antennas module 1101 includes a transmit antenna and TX RF electronics (not shown). The RF/Antennas module 1101 receives the analog data waveform and, after the TX RF electronics perform additional analog signal processing, e.g., baseband mixing and amplification, on the analog data waveform, the transmit antenna wirelessly transmits the analog data waveform.

The operation of the transceiver structure 1100 in the receive mode is now described. The RF/Antennas module 1111 includes a receive antenna and RX RF electronics (not shown). The receive antenna receives an analog data waveform and the RX RF electronics performs additional analog signal processing, e.g., amplification and baseband de-mixing. The RX RF chain 1125 receives the analog data waveform from the RF/Antennas module 1101 and converts it into digital data. The RX data processor 1123 receives the digital data from the RX RF chain 1125 and processes the received data. The data processing can include a FFT, data decompression, or security decoding performed in the digital domain. The processed data is then stored in the data sink 1121.

Figure 12B:
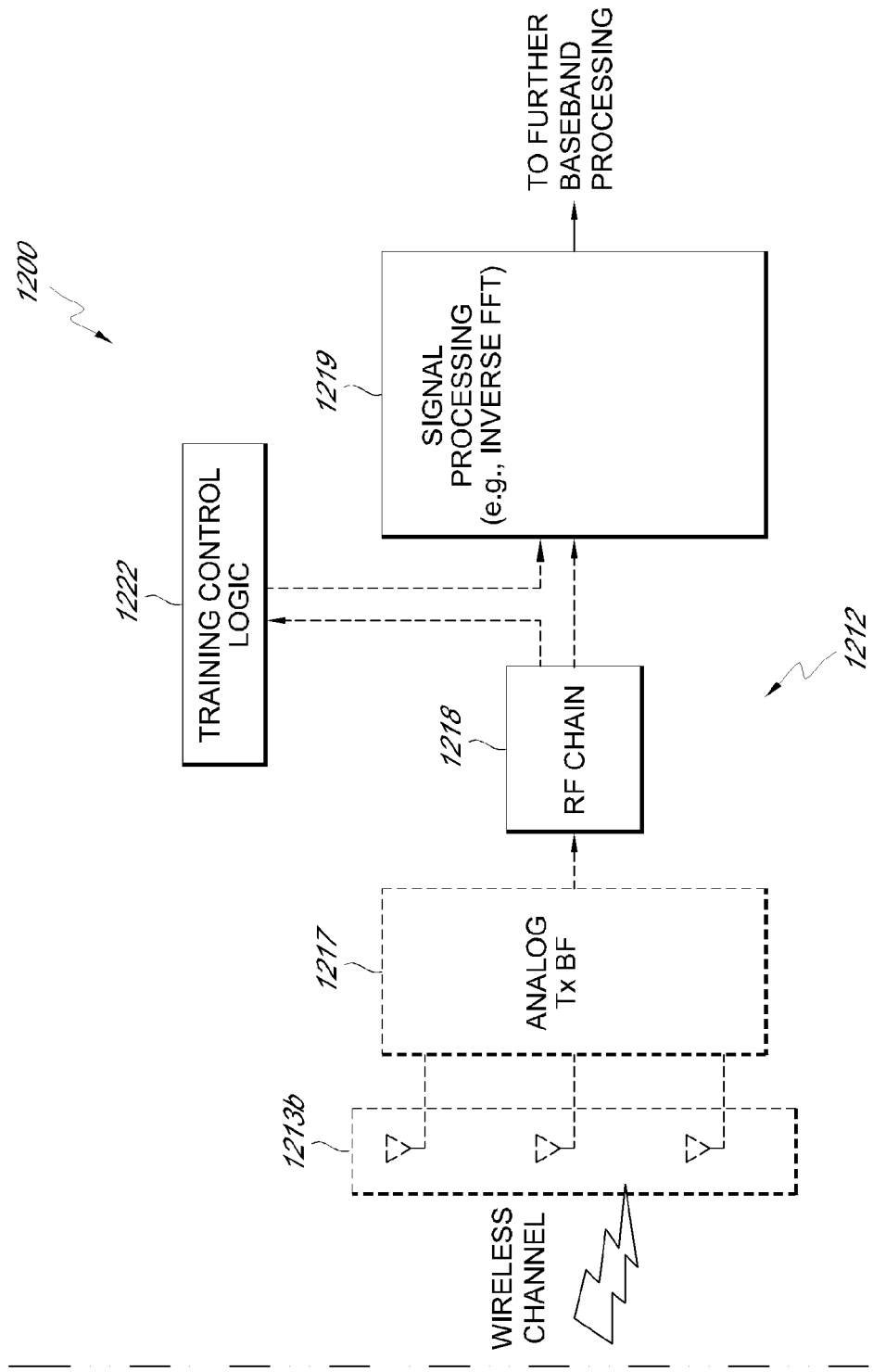

In certain embodiments a pair of communication devices, e.g., transmit and receive devices with directional antennas engaging in data communication, perform an antenna training process in order to improve the signal-to-noise ratio through beamforming as discussed above. FIG. 12 is a functional block diagram of an example beamforming wireless system 1200 comprising two beamforming communication devices—a transmitter 1211 (e.g., a coordinator) and a receiver 1212 (e.g., STA2)—that are configured to perform an antenna training session prior to transmitting data via beamforming, e.g., audio and/or video (A/V) data. The transmitter 1211 and receiver 1212 include transmit and receive antennas 1213a and 1213b, respectively. In the illustrated example, the beamforming wireless system 1200 is an analog beamforming wireless system as the beamforming (antenna weighting) operation is carried out in the analog domain. However, it will be appreciated that the system 1200 can be a digital beamforming wireless system. In some embodiments, each of the transmitter and receiver contains a directional antenna comprising multiple antenna elements.

FIGS. 13A, 13B and 13C show different types of directional antennas that can be incorporated in transmit or receive devices such as the ones shown in FIG. 12. In some embodiments, the directional antenna includes a phased array antenna 1310 represented by FIG. 13A. In other embodiments, the directional antenna includes a switched array antenna 1320 represented by FIG. 13B. In yet other embodiments, the directional antenna includes a single element directional antenna 1330 represented by FIG. 13C. Various embodiments of the beamforming protocol for heterogeneous directional antennas described herein utilize different types of directional antennas at the transmitter and the receiver. For example, in certain embodiments, the transmit antenna 1213a (FIG. 12) at the transmitter 1211 can be the phased array antenna 1310, and the receive antenna 1213b at the receiver 1212 can be the switched array antenna 1320. In other embodiments, the transmit antenna 1213a at the transmitter 1211 can be the switched array antenna 1320, and the receive antenna 1213b at the receiver 1212 can be the phased array antenna 1310. In yet other embodiments, the transmit antenna 1213a at the transmitter 1211 can be either the phased array antenna 1310 or the switched array antenna 1320, and the receive antenna 1213b at the receiver 1212 can be the single element directional antenna 1330. In yet other embodiments, the transmit antenna 1213a at the transmitter 1211 can be the single element directional antenna 1330, and the receive antenna 1213b at the receiver 1212 can be either the phased array antenna 1310 or the switched array antenna 1320.

Referring again to FIG. 12, the transmit (TX) function of the transmitter 1211 includes a signal processing module 1214. The signal processing module 1214 receives a baseband signal that has undergone an earlier baseband processing, and performs, for example, an inverse Fast Fourier Transform (IFFT) which converts the signal from the frequency domain into a time domain digital signal. In certain embodiments, the signal processing module 1214 can include a processor (not shown), e.g., a microprocessor, a digital signal processor (DSP), a programmable gate array (PGA) and the like, for performing the IFFT and other signal processing functions. The digital signal is then converted into an analog waveform by a digital to analog (D/A) function of an RF chain 1215, and then transmitted to the receiver 1212 via the transmit antenna 1213a after analog beamforming (BF) by an analog TX BF function module 1216. The transmitter 1211 can also include a training control module 1221 that is used during an antenna training session. During the antenna training session, the digital signal output from the signal processing module 1214 is bypassed to the training control module 1221 where at least part of an antenna beamforming algorithm is applied. During the antenna training session, the training control module 1221 generates one or more training sequences. The training sequence then flows into the RF chain 1215, where it is converted into an analog waveform, and transmitted to the receiver 1212 as described above.

The receive (RX) function of the receiver 1212 includes an analog RX BF function module 1217, which cooperatively with the analog TX BF function 1216 provides analog beamforming. A signal transmitted from the transmitter 1211 is received by the receiver 1212 via the receive antenna 1213b. The received signal flows into the analog RX BF function 1217. The analog output signal from the analog RX BF function 1217 is converted to a digital signal in an RF chain 1218, and then converted to a frequency domain baseband signal by, for example, an FFT module inside a signal processing module 1219. The frequency domain baseband signal is then output for a further baseband processing. The receiver 1212 can also include its own training control module 1222 that is used during an antenna training session. During the antenna training session, a digital signal representing a training sequence received from the transmitter 1211 is bypassed to the training control module 1222 where at least part of the antenna beamforming algorithm is applied.

The antenna training algorithm performed by the training control module 1221, 1222 may depend on the antenna configuration. For example, assume that the transmit antenna 1213a is the phased array antenna 1310 (FIG. 13A), and the receive antenna 1213b is the switched array antenna 1320. Then, the part of the antenna beamforming algorithm performed by the training control module 1221 at the transmitter 1211 can include transmitting training sequences via the phased array antenna configured with different estimated beamforming coefficients, while the part of the antenna beamforming algorithm performed by the training control module 1222 can include scanning different antenna sectors of the switched array antenna to receive the training sequences transmitted by the transmitter 1211 and computing or estimating a link quality indicator (LQI) associated with the received training sequences. Various measures of LQI can be used. Some embodiments based on LQI employ signal-to-noise ratios (SNRs) associated with the received training sequences. One of the SNR embodiments employs a maximum-likelihood (ML) SNR estimator technique. Other embodiments based on LQI employ received signal strength indicators (RSSIs). Yet other embodiments based on LQI employ signal to noise and interference ratios (SNIRs).

The aforementioned example embodiments described above can be implemented in many ways, such as program instructions for execution by a processor, as logic circuits, as an application specific integrated circuit, as firmware, etc. For example, the embodiments can be implemented as one or more software or firmware applications, computer-implemented methods, program products stored on a computer useable medium, for execution on one or more processors (e.g., CPU, microcontroller) or other computing devices in a wireless station.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of performing a beamforming training between heterogeneous wireless devices in a wireless network, the method comprising:
   securing a fixed-time period in a superframe to perform beamforming training, the fixed-time period comprising an initiator base training window and a responder base training window;
   determining a first number of slots of the fixed time-period used for transmit sector sweeping based on at least one of a number of transmit sectors of an antenna configuration and a number of receive sectors of the antenna configuration;
   determining a second number of slots of the fixed time-period used for receive sector sweeping based on at least one of the number of transmit sectors of the antenna configuration and the number of receive sectors of the antenna configuration;
   assigning the first number of slots to the initiator base training window;
   assigning the second number of slots to the responder base training window;
   transmitting a first plurality of training packets to a wireless device in a plurality of the transmit sectors in a plurality of the first number of slots, the wireless device to receive the first plurality of training packets and estimate a best transmit sector, wherein the best transmit sector comprises the sector associated with a first training packet of the first plurality of training packets received with a highest link quality;
   receiving data indicative of the best transmit sector from the wireless device;
   receiving a second plurality of training packets from the wireless device in a plurality of the receive sectors in at least one of the second number of slots; and
   estimating a best receive sector, wherein the best receive sector comprises the sector associated with a second training packet of the second plurality of training packets received with a highest link quality so as to complete the beamforming training.

2. The method of claim 1, wherein the initiator base training window comprises a forward link training window, wherein the transmit sectors comprise forward link transmit sectors, wherein the responder base training window comprises a reverse link training window, wherein the receive sectors comprise reverse link receive sectors, wherein the first number of slots comprise forward link slots, and wherein the second number of slots comprise reverse link slots.

3. The method of claim 1, wherein the first training packet received with the highest link quality comprises the first training packet received with the highest signal-to-noise ratio.

4. The method of claim 1, wherein the heterogeneous wireless devices are not associated.

5. The method of claim 1, wherein the fixed-time period is adaptively adjusted for each superframe.

6. A method of performing a beamforming training between heterogeneous devices in a wireless network, the method comprising:
   determining a first number of slots of a fixed time-period in a superframe used for transmit sector sweeping based on at least one of a number of transmit sectors of an antenna configuration and a number of receive sectors of the antenna configuration;
   transmitting at least a first training packet to a wireless device in at least one of the transmit sectors in the first number of slots, the wireless device being configured to receive the first training packet and estimate a best transmit sector, wherein the best transmit sector comprises the sector associated with the first training packet received with a highest link quality; and
   receiving data indicative of the best transmit sector from the wireless device.

7. The method of claim 6, further comprising:
   securing the fixed-time period in the superframe to perform beamforming training, the fixed-time period comprising an initiator base training window; and
   assigning the first number of slots to the initiator base training window.

8. The method of claim 7, wherein the initiator base training window comprises a forward link training window, wherein the transmit sectors comprise forward link transmit sectors, and wherein the first number of slots comprise initiator sector slots.

9. The method of claim 6, further comprising assigning the first number of slots to a responder base training window of the fixed time-period in the superframe.

10. The method of claim 9, wherein the responder base training window comprises a reverse link training window, wherein the transmit sectors comprise reverse link transmit sectors, and wherein the first number of slots comprise responder sector slots.

11. The method of claim 6, wherein the wireless device comprises at least one of a communication station, a network coordinator station, or a mobile terminal.

12. The method of claim 6, wherein the antenna configuration comprises at least one of a single antenna, fixed sector antenna, or phase antenna array.

13. The method of claim 6, further comprising:
   determining a second number of slots of the fixed time-period used for receive sector sweeping based on at least one of the number of transmit sectors of the antenna configuration and the number of receive sectors of the antenna configuration;
   receiving at least a second training packet from the wireless device in at least one of the receive sectors in at least one of the second number of slots; and
   estimating a best receive sector, wherein the best receive sector comprises the sector associated with the second training packet received with a highest link quality.

14. A method of performing a beamforming training between heterogeneous devices in a wireless network, the method comprising:
   determining a first number of slots of a fixed time-period in a superframe used for receive sector sweeping based on at least one of a number of transmit sectors of an antenna configuration and a number of receive sectors of the antenna configuration;
   receiving at least a first training packet from a wireless device in at least one of the receive sectors in at least one of the first number of slots; and estimating a best receive sector, wherein the best receive sector comprises the sector associated with the first training packet received with a highest link quality.

15. The method of claim 14, further comprising:
securing the fixed-time period in the superframe to perform beamforming training, the fixed-time period comprising an initiator base training window; and
assigning the first number of slots to the initiator base training window.

16. The method of claim 15, wherein the initiator base training window comprises a reverse link training window, wherein the receive sectors comprise reverse link receive sectors, and wherein the first number of slots comprise initiator sector slots.

17. The method of claim 14, wherein the antenna configuration comprises at least one of a single antenna, fixed sector antenna, or phase antenna array.

18. A method of performing a beam discovery between devices in a wireless network, the method comprising:
securing a fixed-time period in a superframe to perform beamforming training;
determining a first number of slots of the fixed time-period used for at least one of transmit sector sweeping and receive sector sweeping based on at least an antenna configuration;
determining a second number of slots of the fixed time-period used for at least one of transmit sector sweeping and receive sector sweeping based on at least the antenna configuration; and
mapping the first number of slots and the second number of slots to a total number of slots available within the fixed-time period.

19. The method of claim 18, wherein mapping the first number of slots and the second number of slots comprises assigning the first number of slots and the second number of slots to the total number of slots.

20. The method of claim 18, wherein the sum of the first number of slots and the second number of slots equals the total number of slots.

21. The method of claim 18, wherein the sum of the first number of slots and the second number of slots is less than the total number of slots.

22. The method of claim 18, wherein the first number of slots is determined based on a number of transmit sectors.

23. The method of claim 22, wherein more than one of the first number of slots are allocated for sweeping a first transmit sector of the number of transmit sectors.

24. The method of claim 23, wherein a greater number of the first number of slots are allocated for sweeping the first transmit sector than are allocated for sweeping a second transmit sector of the number of transmit sectors.

25. The method of claim 22, wherein at least two of the transmit sectors are of non-uniform beamwidth.

26. The method of claim 18, wherein the second number of slots is determined based on a number of receive sectors.

27. The method of claim 26, wherein more than one of the second number of slots are allocated for sweeping a first receive sector of the number of receive sectors.

28. The method of claim 27, wherein a greater number of the second number of slots are allocated for sweeping the first receive sector than are allocated for sweeping a second receive sector of the number of receive sectors.

29. The method of claim 26, wherein at least two of the receive sectors are of non-uniform beamwidth.

30. The method of claim 18, wherein the first number of slots and the second number of slots are based on a number of transmit sectors and a number of receive sectors.

31. A wireless network coordinator comprising:
an antenna;
a processor to:
secure a fixed-time period in a superframe to perform beamforming training, the fixed-time period comprising an initiator base training window and a responder base training window;
determine a first number of slots of the fixed time-period used for transmit sector sweeping based on at least one of a number of transmit sectors of the antenna and a number of receive sectors of the antenna;
determine a second number of slots of the fixed time-period used for receive sector sweeping based on at least one of the number of transmit sectors of the antenna and the number of receive sectors of the antenna;
assign the first number of slots to the initiator base training window;
assign the second number of slots to the responder base training window;
transmit at least a first training packet to a wireless device in at least one of the transmit sectors in the first number of slots, the wireless device being configured to receive the training packet and estimate a best transmit sector, wherein the best transmit sector comprises the sector associated with the first training packet received with a highest link quality;
receive data indicative of the best transmit sector from the wireless device;
receive at least a second training packet from the wireless device in at least one of the receive sectors in at least one of the second number of slots; and
estimate a best receive sector, wherein the best receive sector comprises the sector associated with the second training packet received with a highest link quality.

32. The coordinator of claim 31, wherein the initiator base training window comprises a forward link training window, wherein the transmit sectors comprise forward link transmit sectors, wherein the responder base training window comprises a reverse link training window, wherein the receive sectors comprise reverse link receive sectors, wherein the first number of slots comprise forward link slots, and wherein the second number of slots comprise reverse link slots.

33. A wireless station comprising:
an antenna;
a processor to:
determine a first number of slots of a fixed time-period in a superframe used for transmit sector sweeping based on at least one of a number of transmit sectors of an antenna configuration and a number of receive sectors of the antenna configuration;
transmit at least a first training packet to a wireless device in at least one of the transmit sectors in the first number of slots, the wireless device being configured to receive the first training packet and estimate a best transmit sector, wherein the best transmit sector comprises the sector associated with the first training packet received with a highest link quality; and
receive data indicative of the best transmit sector from the wireless device.

34. The wireless station of claim 33, wherein the processor is further configured to:
secure the fixed-time period in the superframe to perform beamforming training, the fixed-time period comprising an initiator base training window; and
assign the first number of slots to the initiator base training window.

35. The wireless station of claim 34, wherein the initiator base training window comprises a forward link training window, wherein the transmit sectors comprise forward link transmit sectors, and wherein the first number of slots comprise initiator sector slots.

36. The wireless station of claim 33, wherein the process is further configured to assign the first number of slots to a responder base training window of the fixed time-period in the superframe.

37. The wireless station of claim 36, wherein the responder base training window comprises a reverse link training window, wherein the transmit sectors comprise reverse link transmit sectors, and wherein the first number of slots comprise responder sector slots.

38. The wireless station of claim 33, wherein the wireless device comprises at least one of a communication station, a network coordinator station, or a mobile terminal.

39. The wireless station of claim 33, wherein the antenna configuration comprises at least one of a single antenna, fixed sector antenna, or phase antenna array.

40. The wireless station of claim 33, wherein the processor is further configured to:
 determine a second number of slots of the fixed time-period used for receive sector sweeping based on at least one of the number of transmit sectors of the antenna configuration and the number of receive sectors of the antenna configuration;
 receive at least a second training packet from the wireless device in at least one of the receive sectors in at least one of the second number of slots; and
 estimate a best receive sector, wherein the best receive sector comprises the sector associated with the second training packet received with a highest link quality.

41. A wireless station comprising:
 an antenna;
 a processor to:
  determine a first number of slots of a fixed time-period in a superframe used for receive sector sweeping based on at least one of a number of transmit sectors of an antenna configuration and a number of receive sectors of the antenna configuration;
  receive at least a first training packet from a wireless device in at least one of the receive sectors in at least one of the first number of slots; and
  estimate a best receive sector, wherein the best receive sector comprises the sector associated with the first training packet received with a highest link quality.

42. The wireless station of claim 41, wherein the processor is further configured to:
 secure the fixed-time period in the superframe to perform beamforming training, the fixed-time period comprising an initiator base training window; and
 assign the first number of slots to the initiator base training window.

43. The wireless station of claim 37, wherein the initiator base training window comprises a reverse link training window, wherein the receive sectors comprise reverse link receive sectors, and wherein the first number of slots comprise initiator sector slots.

44. The wireless station of claim 41, wherein the processor is further configured to assign the first number of slots to a responder base training window of the fixed time-period in the superframe.

45. The wireless station of claim 44, wherein the responder base training window comprises a forward link training window, wherein the receive sectors comprise forward link receive sectors, and wherein the first number of slots comprise responder sector slots.

46. The wireless station of claim 41, wherein the wireless device comprises at least one of a communication station, a network coordinator station, or a mobile terminal.

47. The wireless station of claim 41, wherein the antenna configuration comprises at least one of a single antenna, fixed sector antenna, or phase antenna array.

48. A wireless network coordinator comprising:
 an antenna;
 a processor to:
  secure a fixed-time period in a superframe to perform beamforming training;
  determine a first number of slots of the fixed time-period used for at least one of transmit sector sweeping and receive sector sweeping based on at least an antenna configuration;
  determine a second number of slots of the fixed time-period used for at least one of transmit sector sweeping and receive sector sweeping based on at least the antenna configuration; and
  map the first number of slots and the second number of slots to a total number of slots available within the fixed-time period.

49. The coordinator of claim 48, wherein the processor is configured to map the first number of slots and the second number of slots by assigning the first number of slots and the second number of slots to the total number of slots.

50. The coordinator of claim 48, wherein the sum of the first number of slots and the second number of slots equals the total number of slots.

51. The coordinator of claim 48, wherein the sum of the first number of slots and the second number of slots is less than the total number of slots.

52. The coordinator of claim 48, wherein the first number of slots is determined based on a number of transmit sectors.

53. The coordinator of claim 52, wherein more than one of the first number of slots are allocated for sweeping a first transmit sector of the number of transmit sectors.

54. The coordinator of claim 53, wherein a greater number of the first number of slots are allocated for sweeping the first transmit sector than are allocated for sweeping a second transmit sector of the number of transmit sectors.

55. The coordinator of claim 52, wherein at least two of the transmit sectors are of non-uniform beamwidth.

56. The coordinator of claim 48, wherein the second number of slots is determined based on a number of receive sectors.

57. The coordinator of claim 56, wherein more than one of the second number of slots are allocated for sweeping a first receive sector of the number of receive sectors.

58. The coordinator of claim 57, wherein a greater number of the second number of slots are allocated for sweeping the first receive sector than are allocated for sweeping a second receive sector of the coordinator of receive sectors.

59. The coordinator of claim 56, wherein at least two of the receive sectors are of non-uniform beamwidth.

60. The coordinator of claim 48, wherein the first number of slots and the second number of slots are based on a number of transmit sectors and a number of receive sectors.

* * * * *